Figure 30:
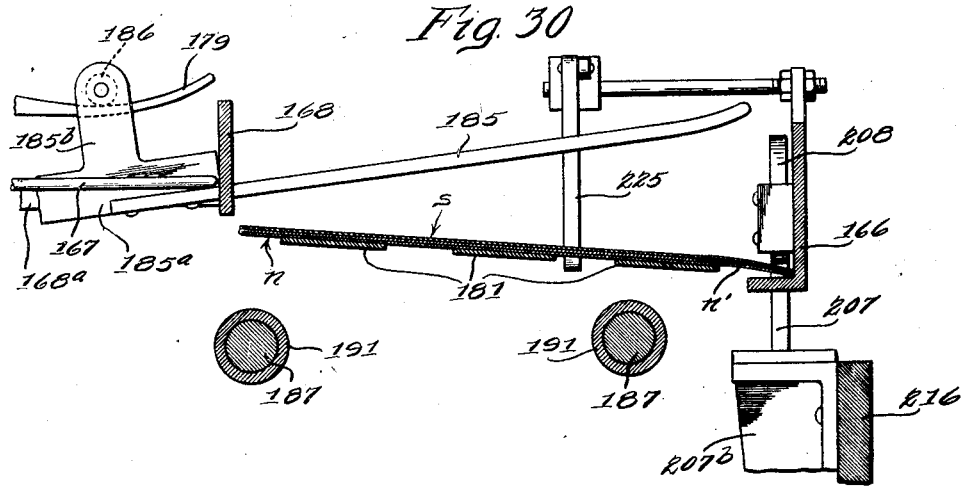

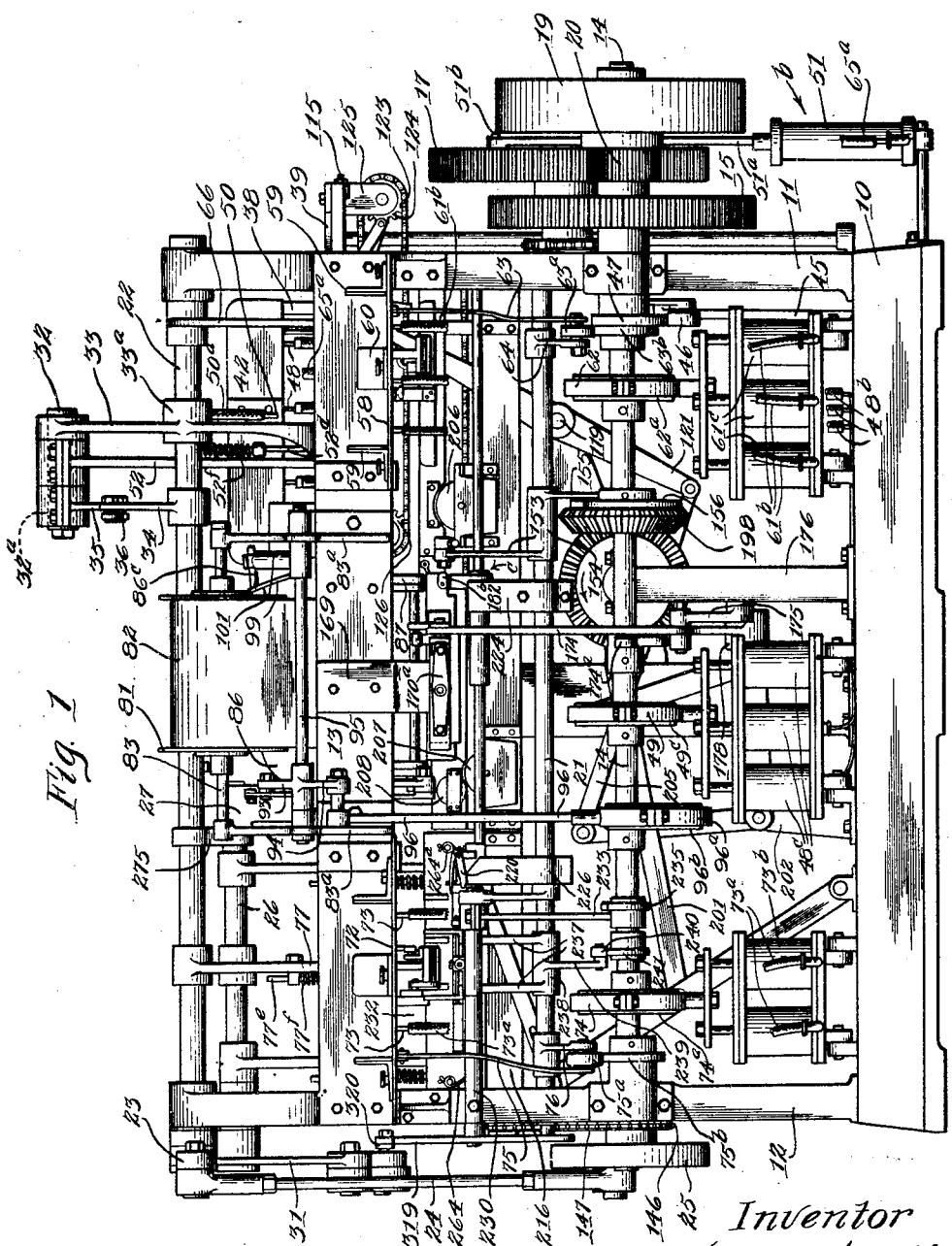

Oct. 23, 1928.　　　　　　　　　　　　　　　　　　　　　1,688,666
S. SMITH
MACHINE FOR FORMING BOOK END SECTIONS
Original Filed March 28, 1925　　　16 Sheets-Sheet 2
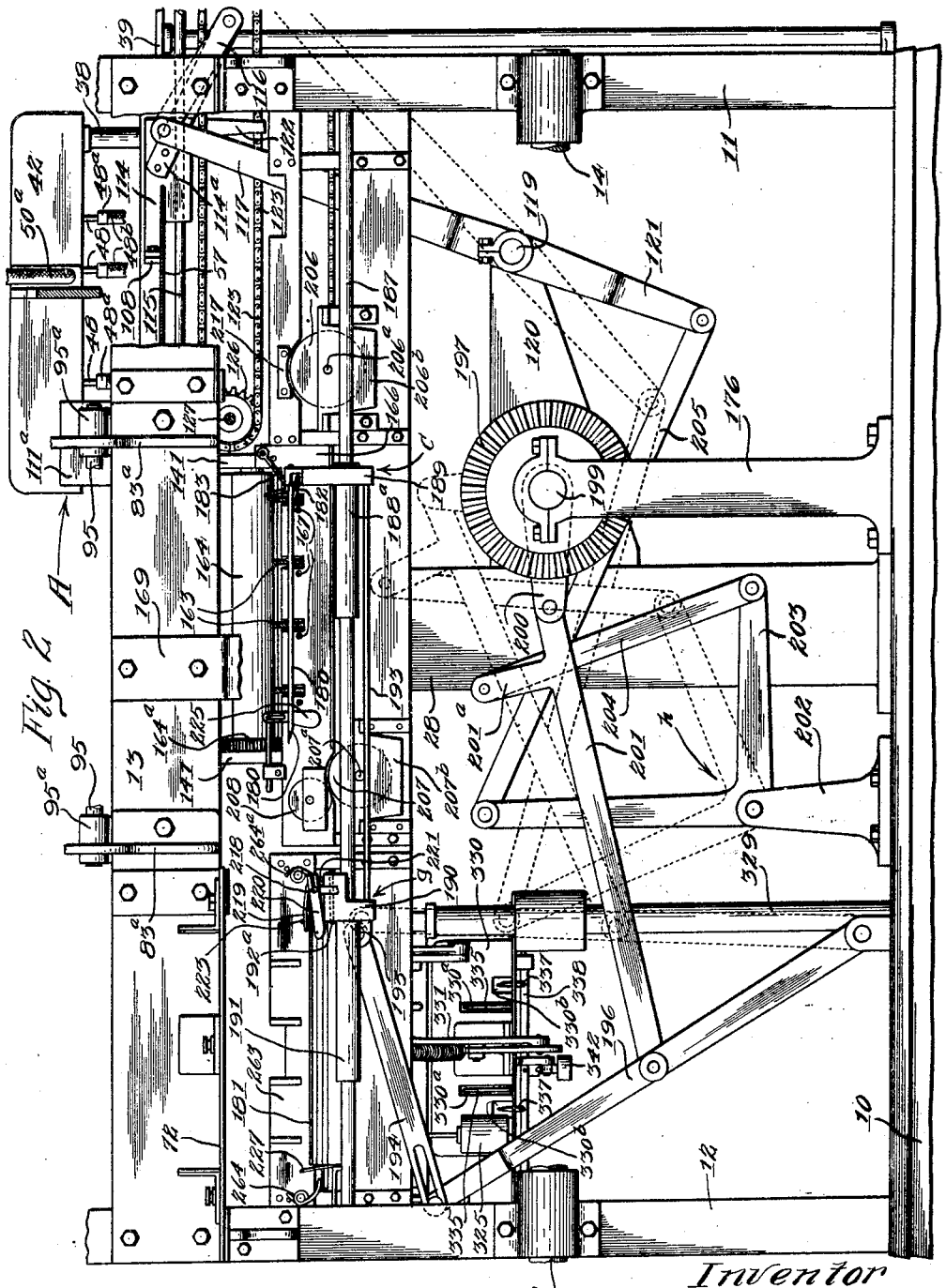
Inventor
Swan Smith
By Bradbury + Caswell
Attorneys

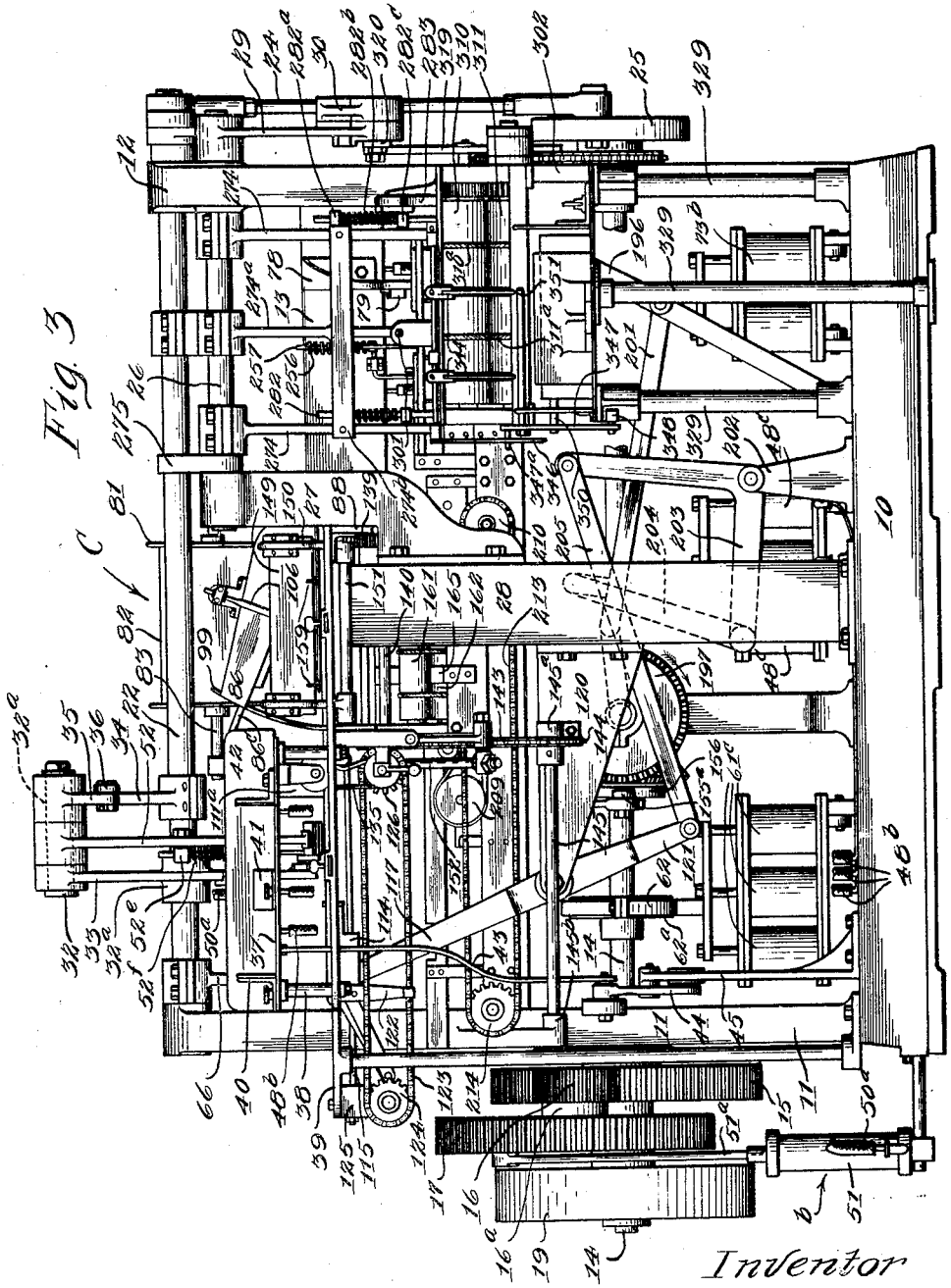

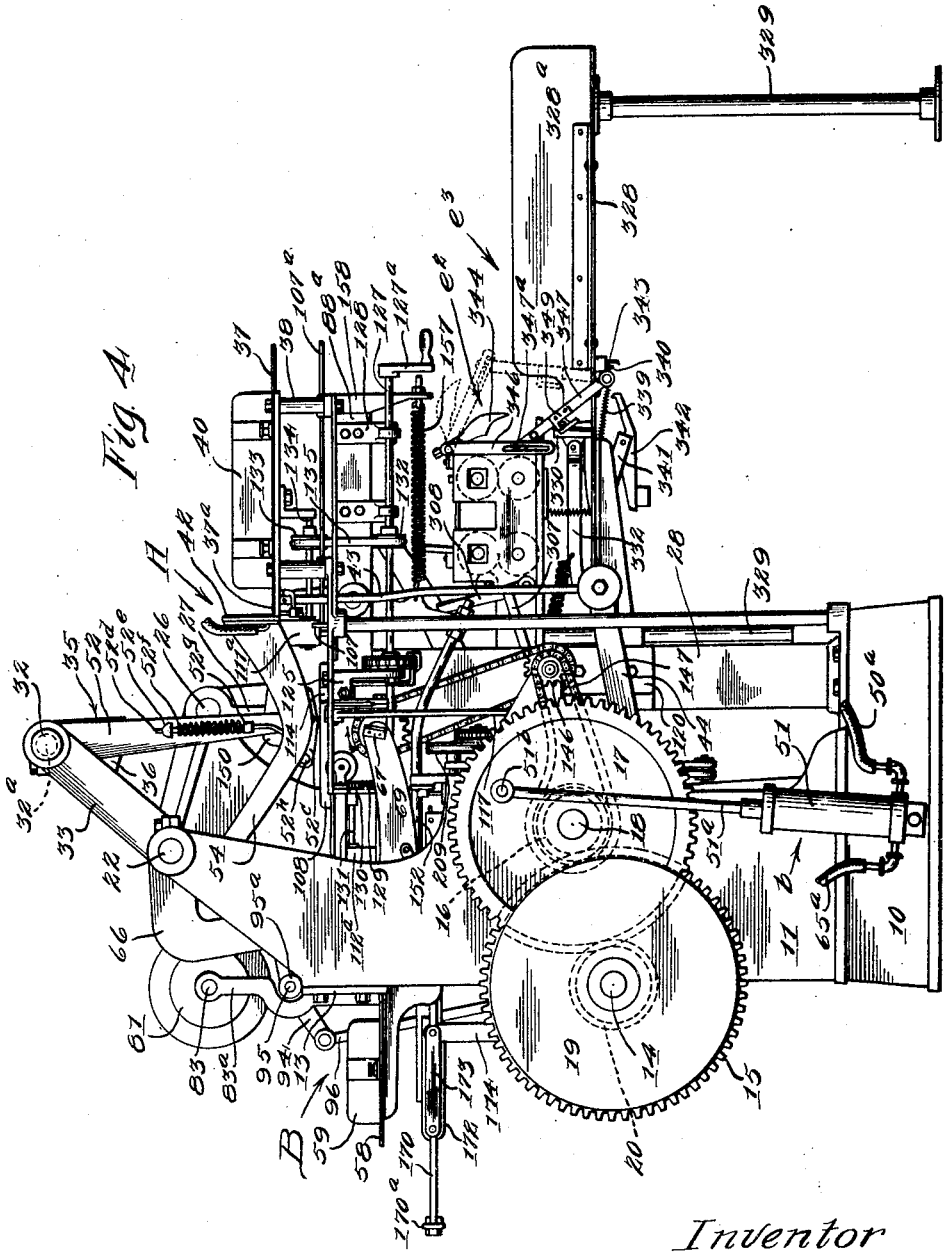

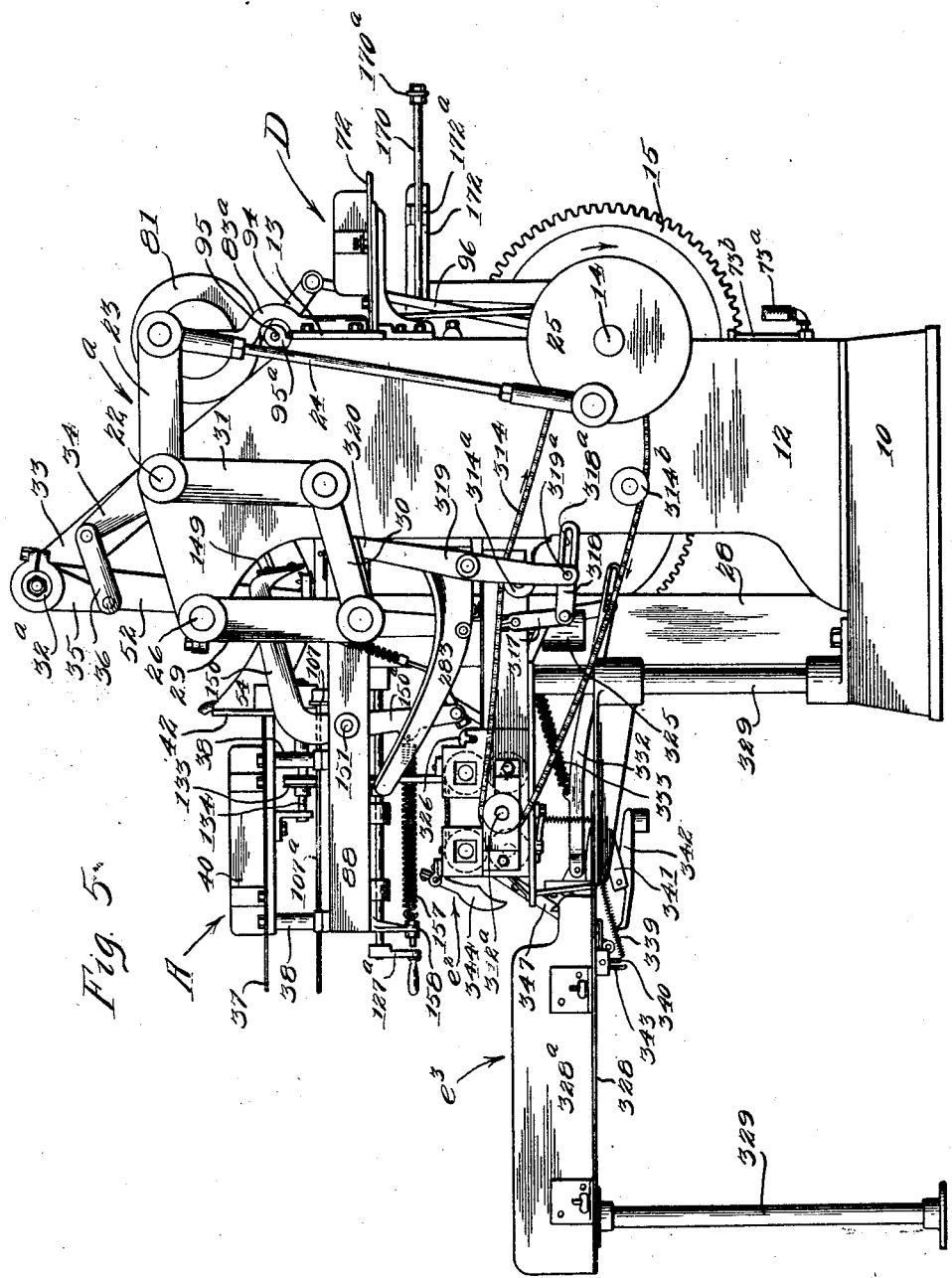

Oct. 23, 1928.
S. SMITH
1,688,666
MACHINE FOR FORMING BOOK END SECTIONS
Original Filed March 28, 1925    16 Sheets-Sheet 6
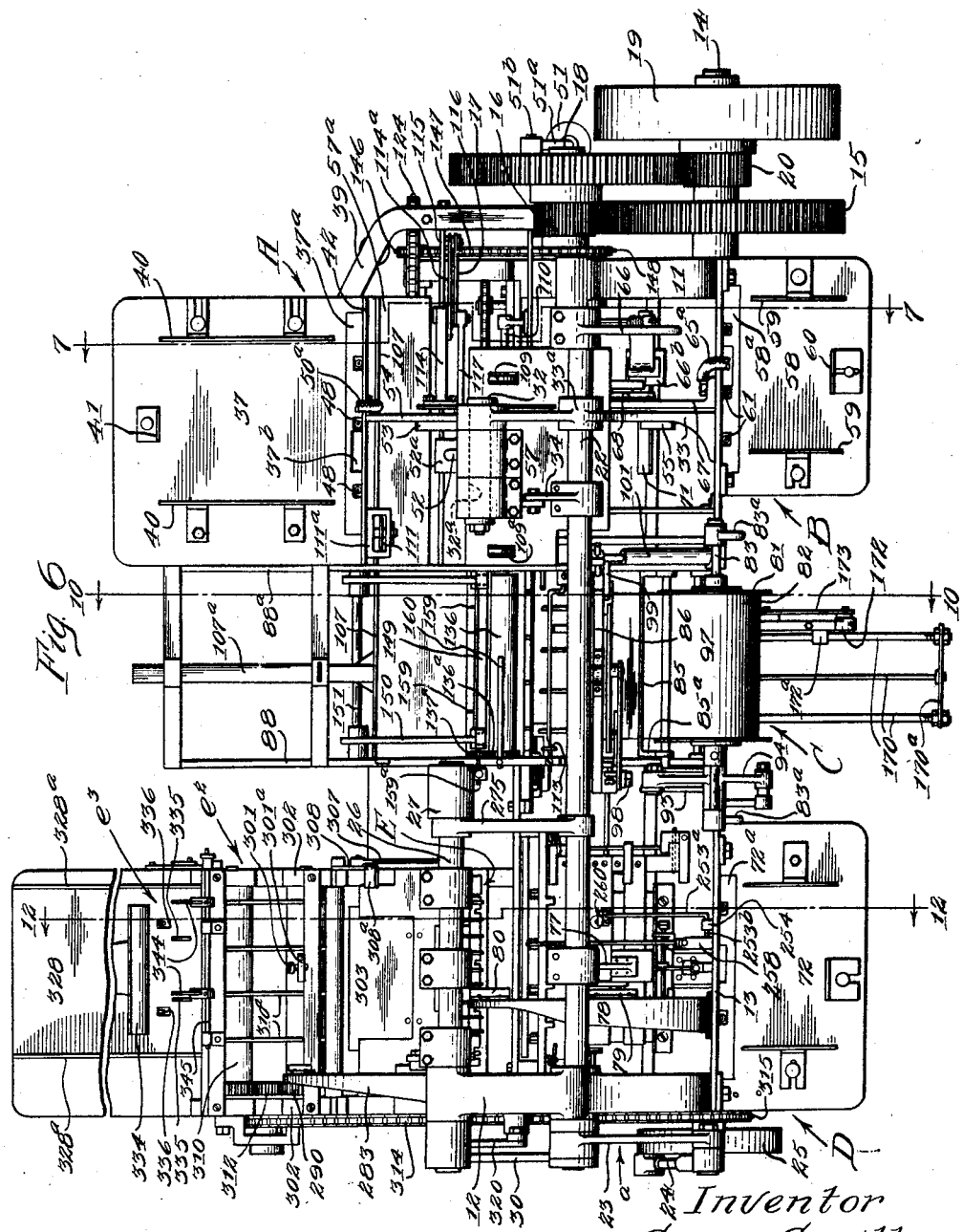
Inventor
Swan Smith
By Bradbury + Caswell
Attorneys

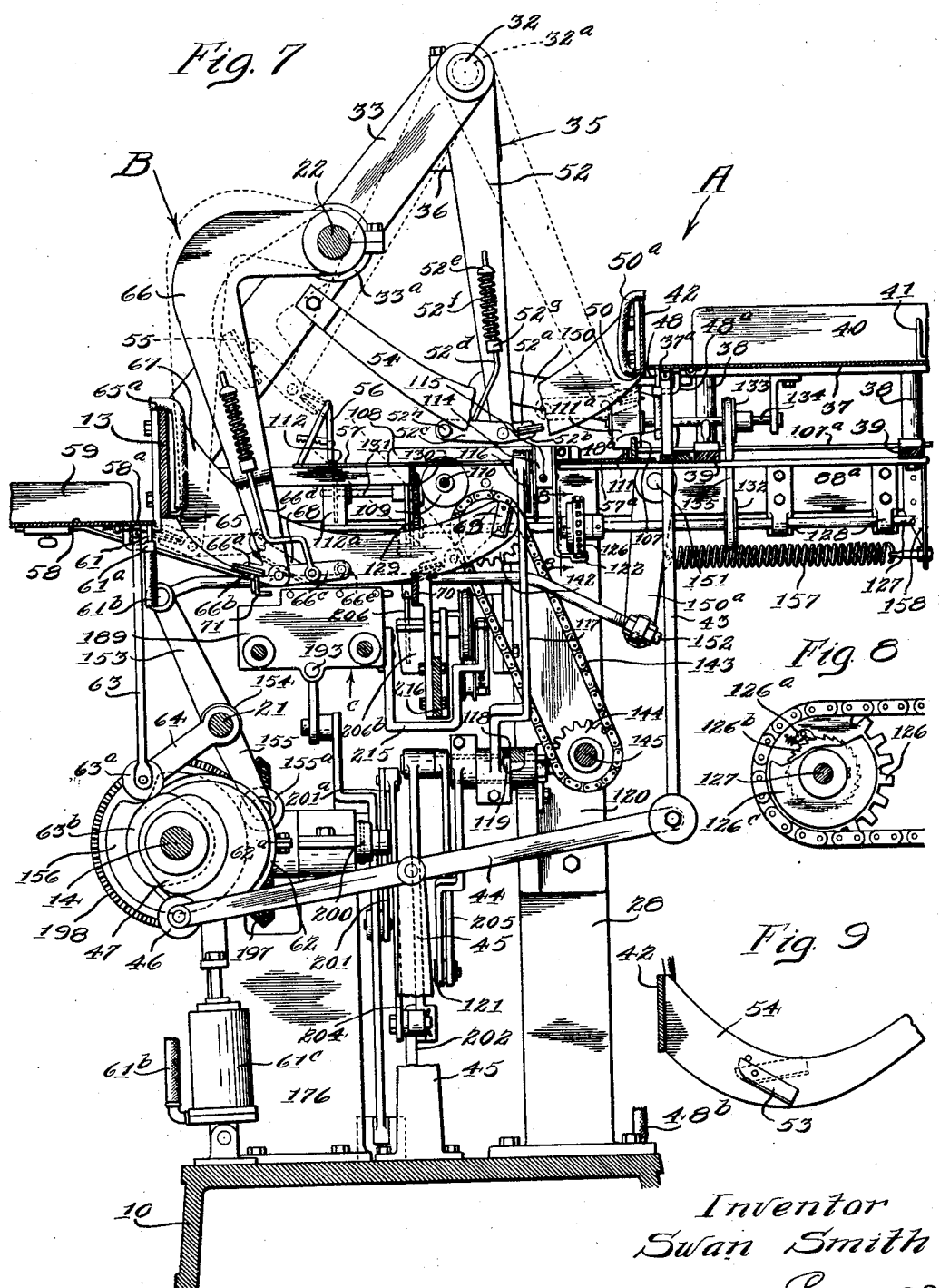

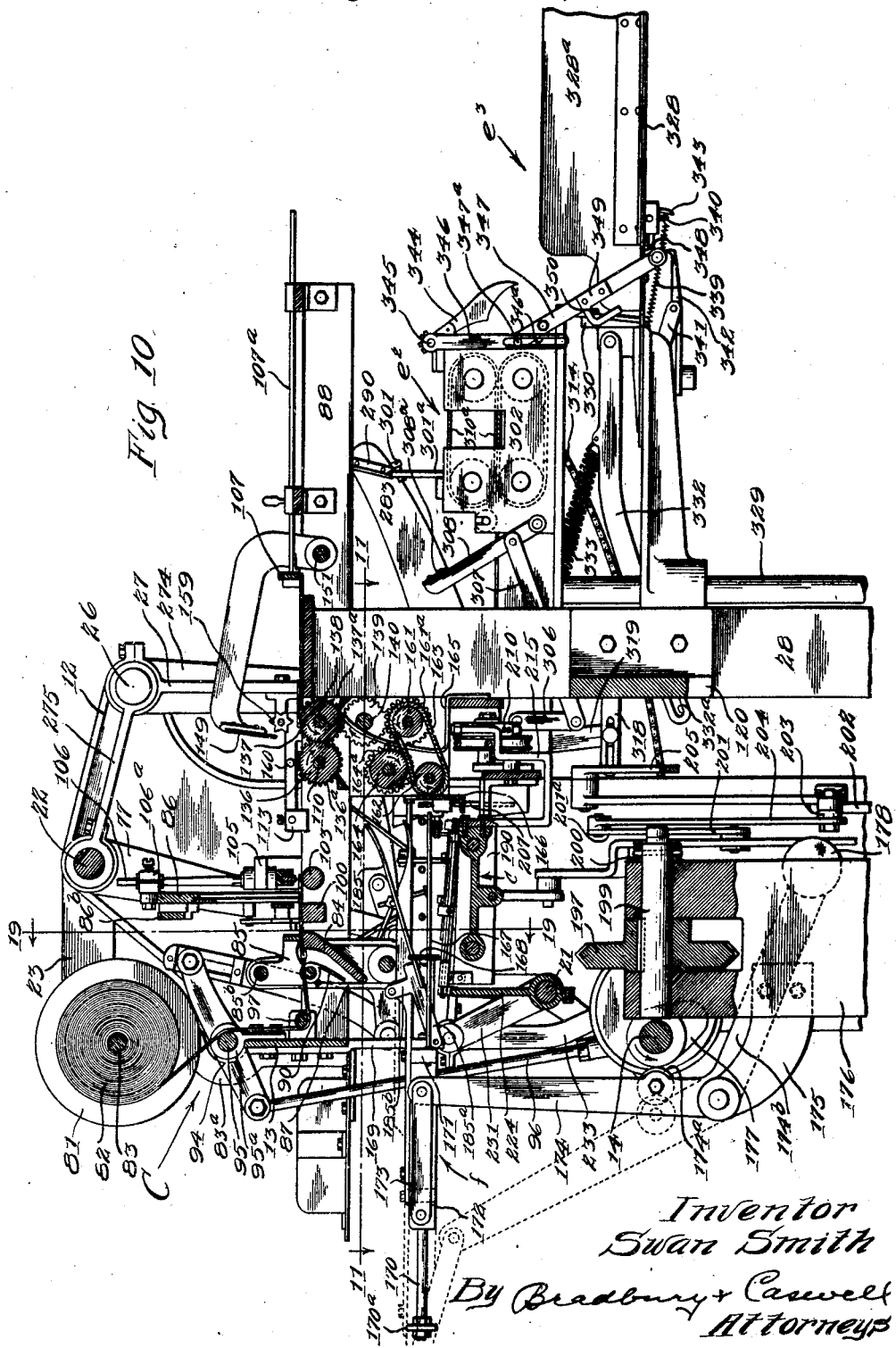

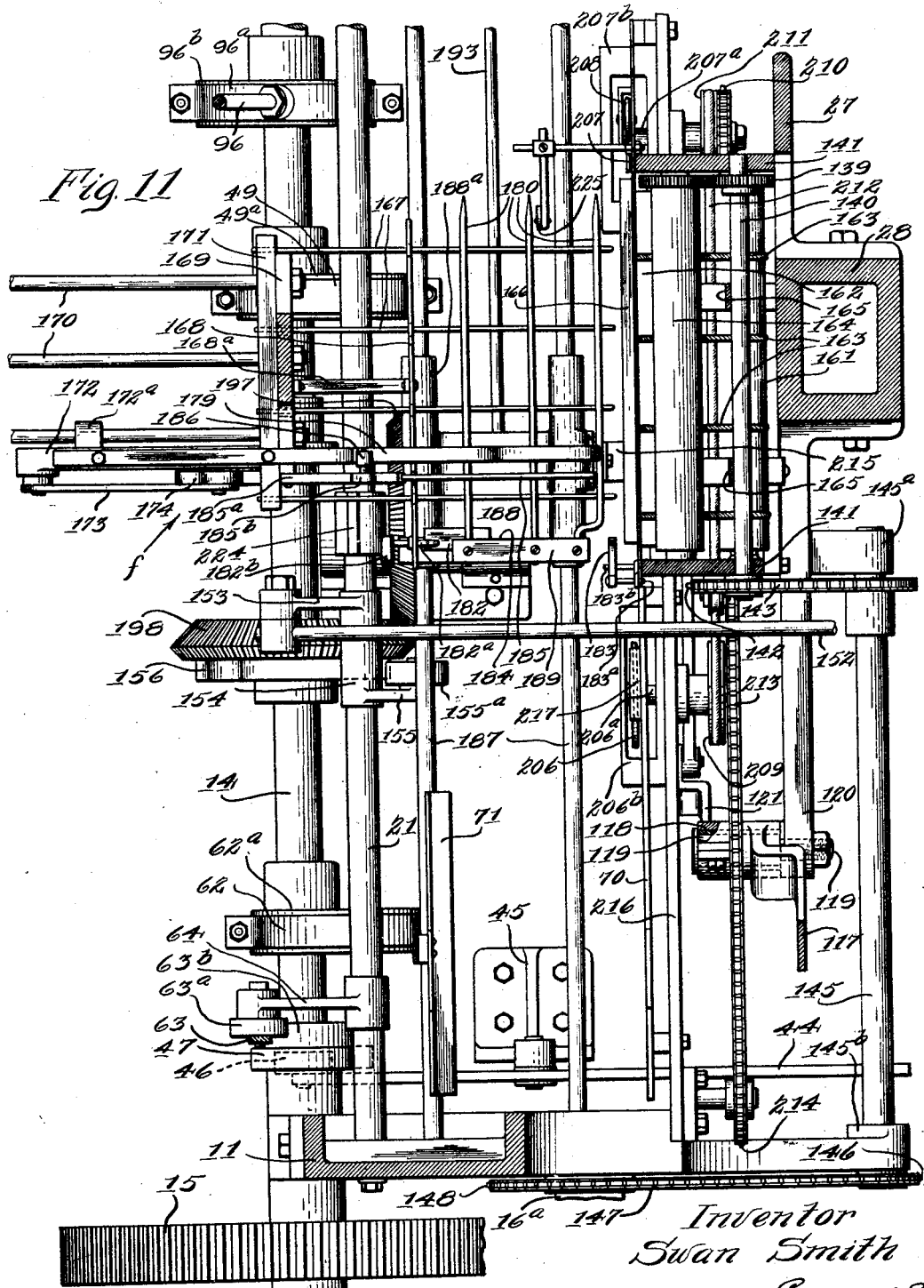

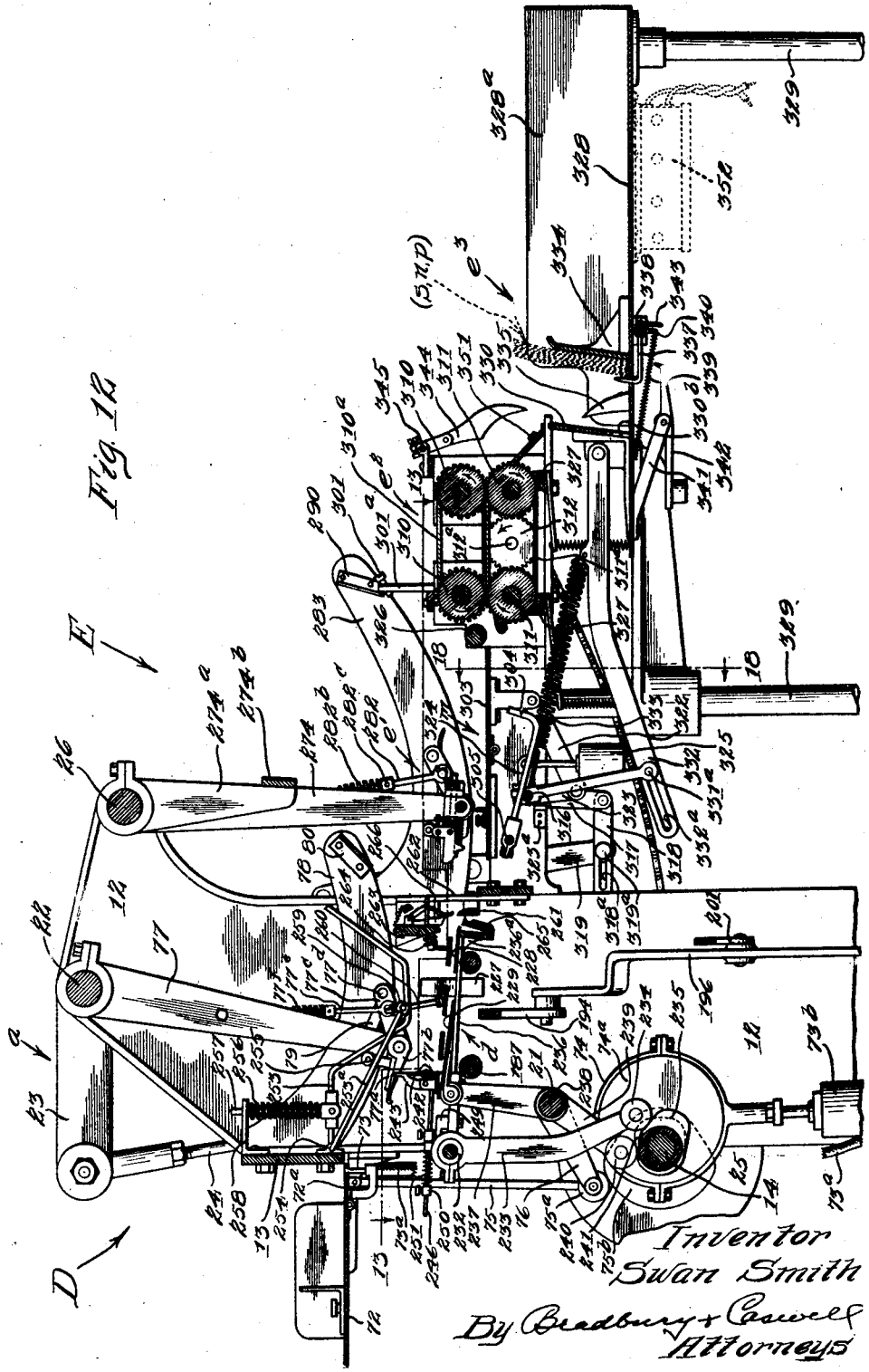

Oct. 23, 1928.
S. SMITH
1,688,666
MACHINE FOR FORMING BOOK END SECTIONS
Original Filed March 28, 1925   16 Sheets-Sheet 11
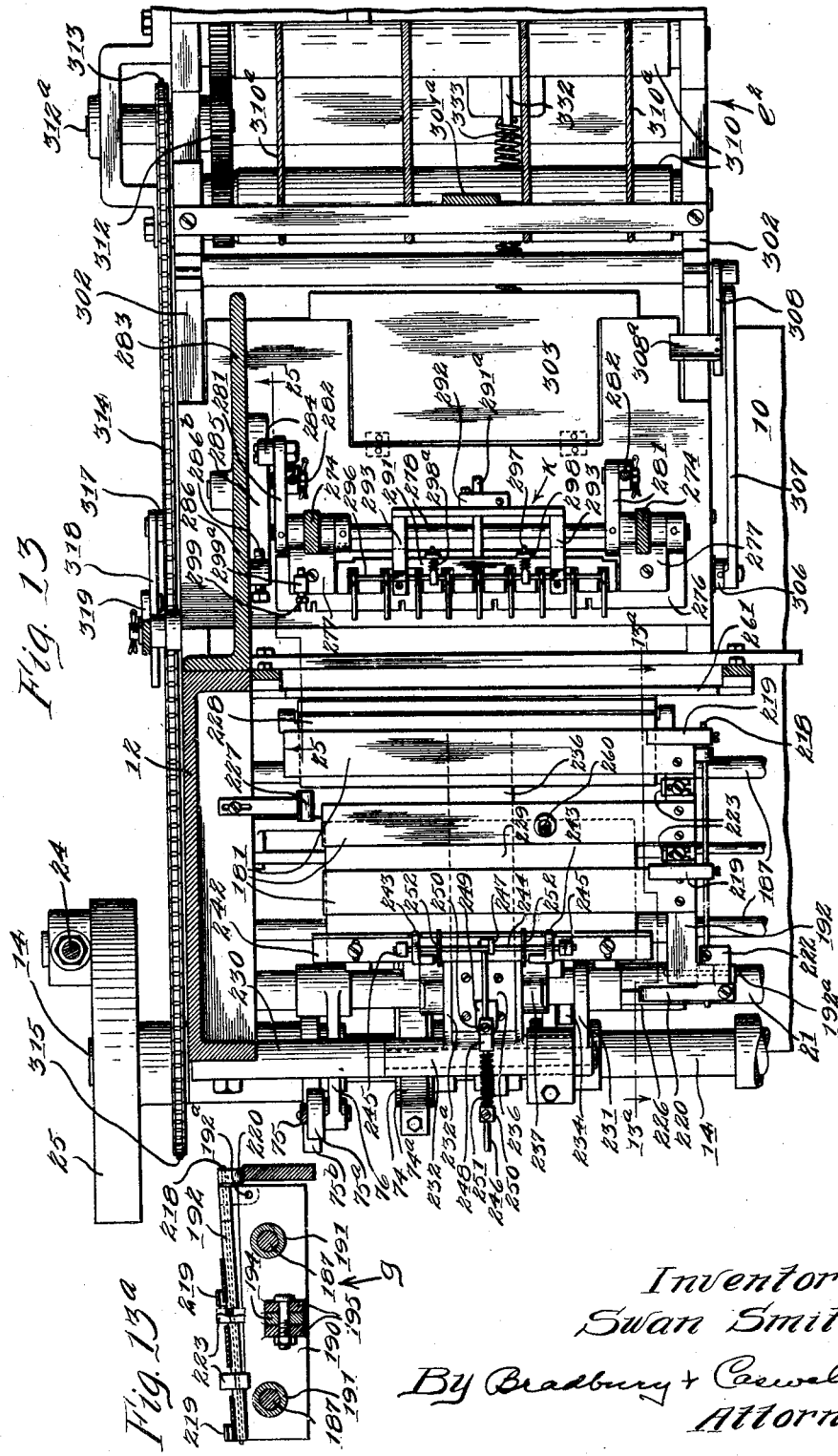
Inventor
Swan Smith
By Bradbury & Caswell
Attorneys

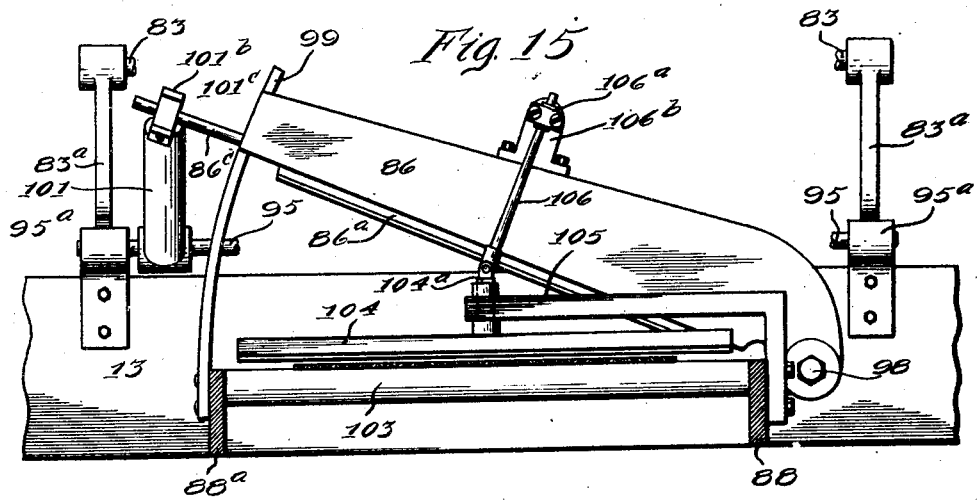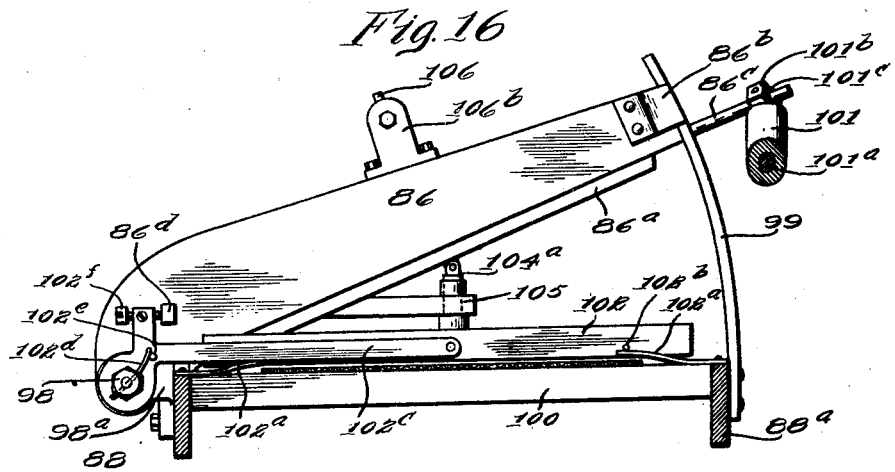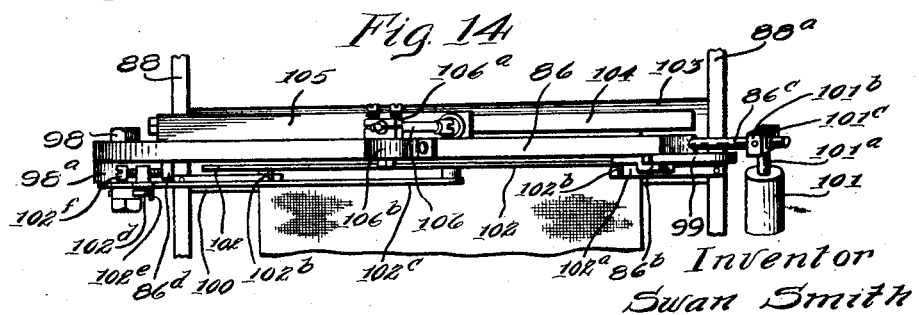

Oct. 23, 1928.
S. SMITH
1,688,666
MACHINE FOR FORMING BOOK END SECTIONS
Original Filed March 28, 1925    16 Sheets-Sheet 13
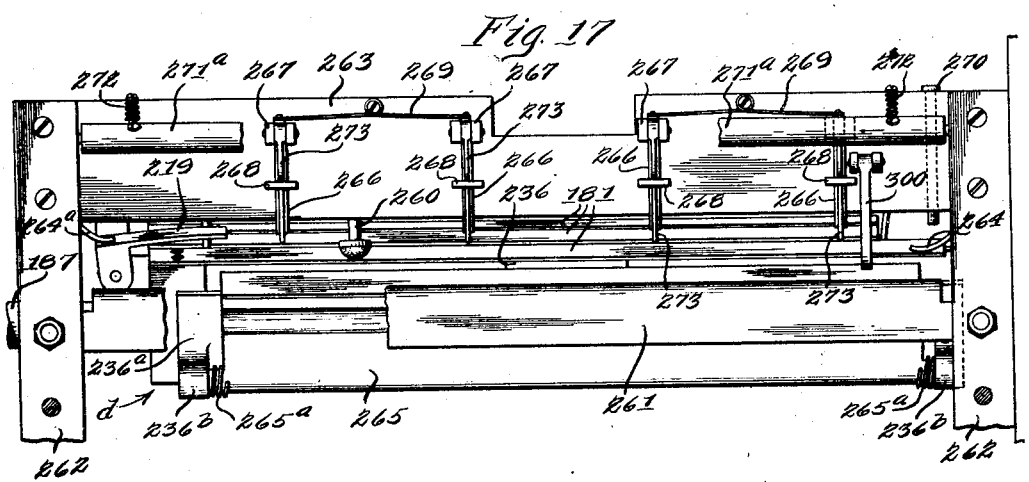
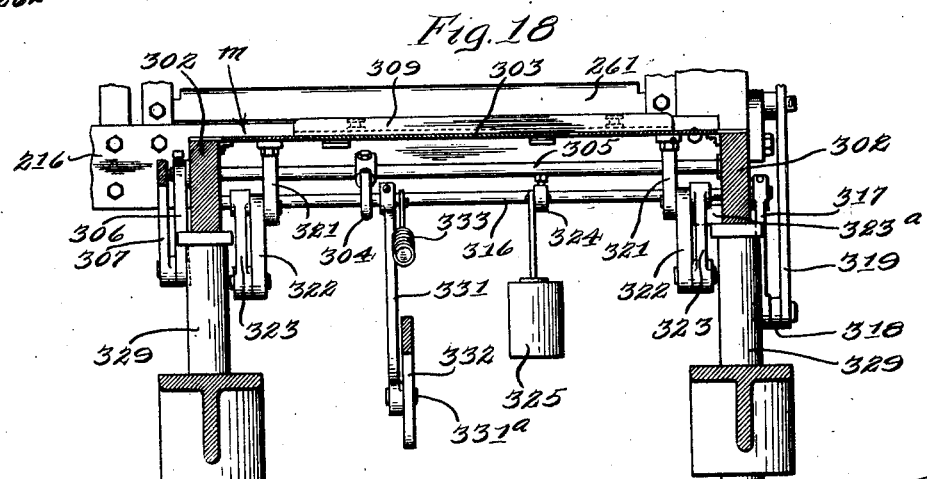
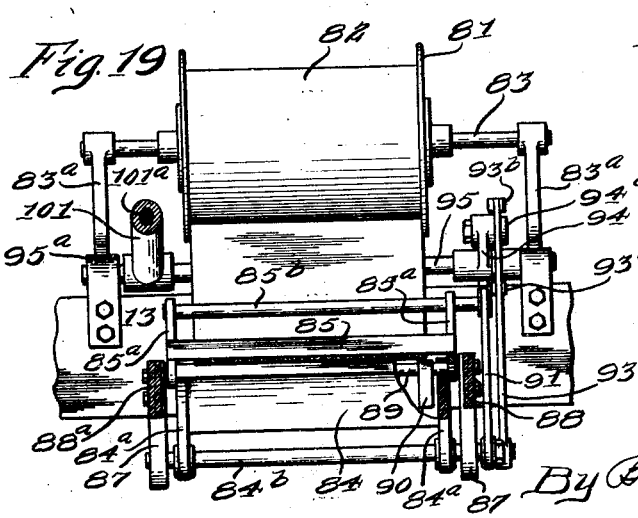
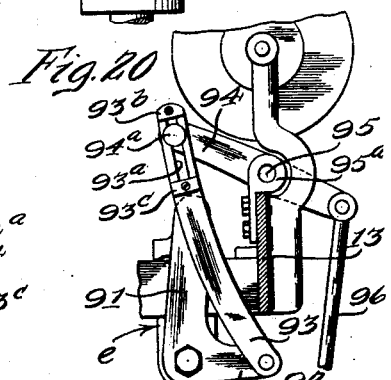
Inventor
Swan Smith
By Bradbury & Caswell
Attorneys Oct. 23, 1928.
S. SMITH
1,688,666
MACHINE FOR FORMING BOOK END SECTIONS
Original Filed March 28, 1925 16 Sheets-Sheet 14
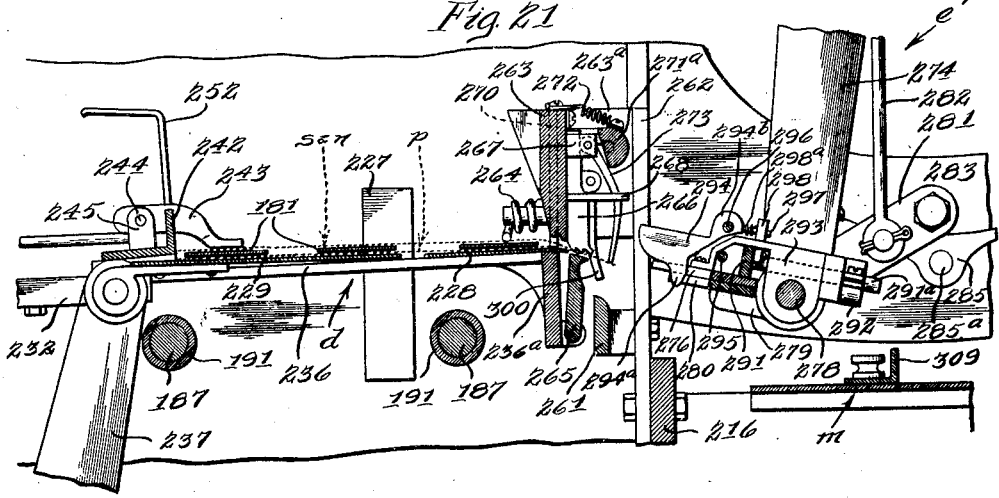
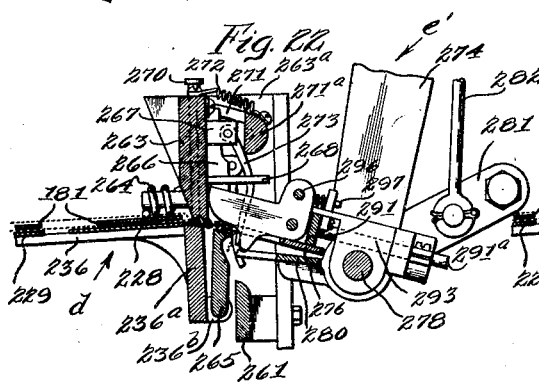
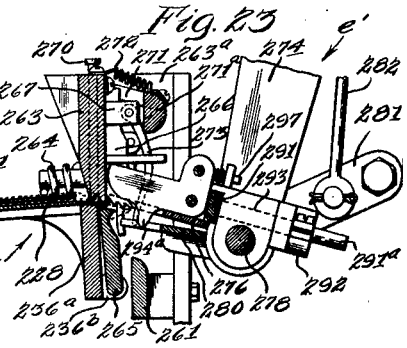
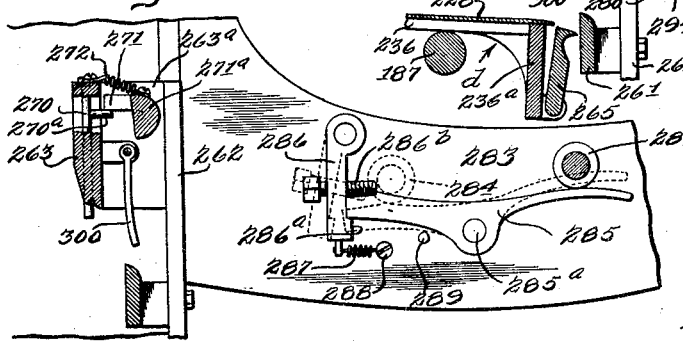
Inventor
Swan Smith
By Bradbury + Caswell
Attorneys

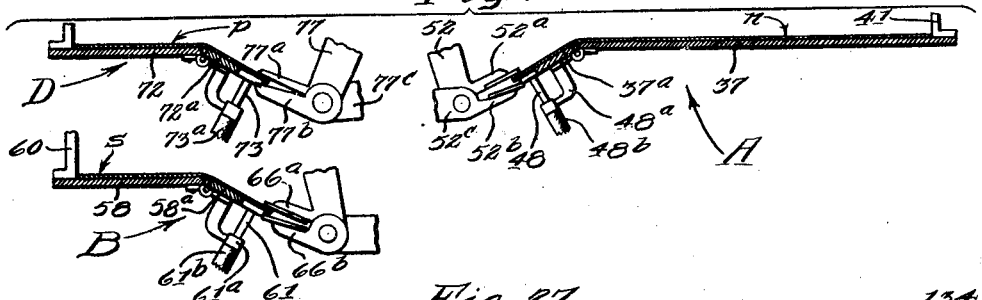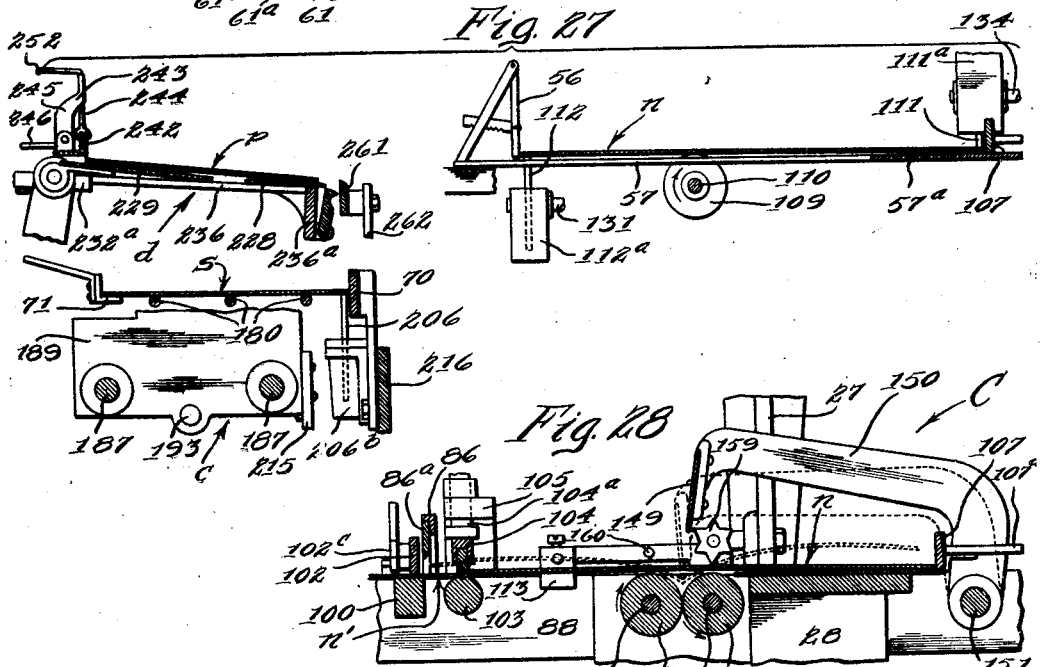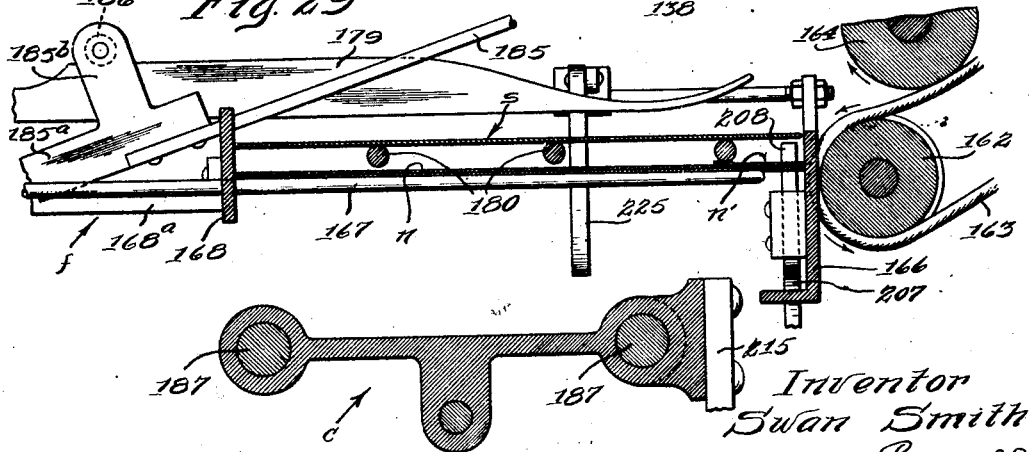

Oct. 23, 1928.

S. SMITH 1,688,666

MACHINE FOR FORMING BOOK END SECTIONS

Original Filed March 28, 1925    16 Sheets-Sheet 16

Inventor
Swan Smith.
By Bradbury + Caswell
Attorneys

Patented Oct. 23, 1928.

1,688,666

UNITED STATES PATENT OFFICE.

SWAN SMITH, OF WHITE BEAR, MINNESOTA, ASSIGNOR OF ONE-HALF TO WEST PUBLISHING COMPANY, OF ST. PAUL, MINNESOTA, A CORPORATION OF MINNESOTA.

MACHINE FOR FORMING BOOK END SECTIONS.

Application filed March 28, 1925, Serial No. 19,042. Renewed February 6, 1928.

My invention relates to improvements in machines for and method of forming end-sections for books.

As is well known in the art of book binding, a book end-section includes a terminal book-section or printed-section, either a "first" or a "last" book-section according to the predetermined position thereof in a book. It always includes an end-sheet, which is fastened at the back thereof to its respective book-section and this so-called end-sheet may be bound with a fabric hinge-strip to form a cloth joint at the junction between end-sheet and printed book-section.

Further, it most always includes a fly-leaf for finishing purposes, the same being arranged inside of the end-sheet and it also sometimes includes a smudge-sheet outside of the end-sheet.

In binding a book, the end-sheets of the end-sections are pasted to the inside of the cover-pieces and, in best practice, are cloth jointed. In binding by the "cased in" method, the end-sections are handled so little as not to appreciably soil the end-sheets. In hand bound work however, an unprotected end-sheet is likely to become detrimentally marked by the fingers or otherwise. In the former method smudge-sheets ordinarily are dispensed with, but in the latter they are used to guard the end-sheets until the time arrives for the pasting thereof to the cover-pieces of a book. At such time the smudge-sheets have answered their purpose and they are then torn away to allow of the pasting of the end-sheets to the cover-pieces.

In forming book end-sections by hand in binderies of relatively large capacity, it has been experienced that a large number of employees for such purpose is required to meet with quantity production. The output of a skilled worker is comparatively small as will be appreciated when it is understood that the assembling of a single end-section may require the binding of an end-sheet with a fabric hinge-strip, the application of a separate fly-leaf inside of the end-sheet, the application of a smudge sheet outside of the end-sheet and, further, the application of said assembled sheets and leaf to a printed-section, the marginal pasting, registeration, sealing and folding of said members being involved in the operation.

An object of the present invention is to provide a machine designed to take individually the various members of end-sections from sources of supply and gather, paste, seal, fold and deliver the same in assembled form.

Another object is to improve the method of forming end-sections, the same consisting in part, in the folding of an elongated sheet between the ends thereof to provide an end-sheet and fly-leaf each held with respect to and by the other for subsequent operations in the process.

A further object is to supply a simple and durable machine of relatively great capacity for carrying out my improved method in the formation of book end-sections, said machine being automatic in operation and requiring a minimum of attention in the use thereof.

With the foregoing and other objects in view, which will appear in the following description, the invention resides in the novel combination and arrangement of parts and in the details of construction hereinafter described and claimed.

Figure 31:
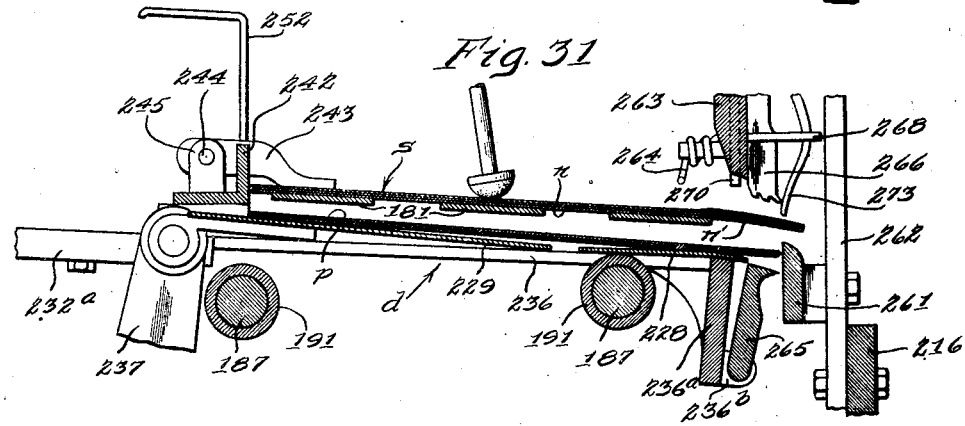
Figure 32:
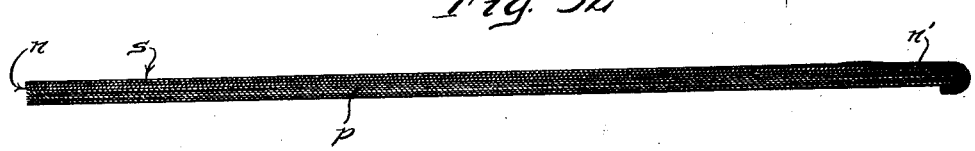

In the drawings, Fig. 1 is a front elevation of a machine embodying my invention; Fig. 2 is a view similar to Fig. 1, the same being illustrated fragmentarily to permit of enlargement and having parts removed and broken away from the front of the machine to show inner mechanism not clearly seen in said Fig. 1; Fig. 3 is a rear elevation of the machine; Fig. 4 is an elevational view taken at the head of the machine; Fig. 5 is an elevational view of the machine taken at the foot thereof; Fig. 6 is a plan view of the assembly; Fig. 7 is a vertical sectional view taken on the line 7—7 of Fig. 6; Fig. 8 is a detail view taken as on the line 8—8 of Fig. 7 and illustrates one of the ratcheting driving devices employed in turning a sheet pasting wheel; Fig. 9 is an elevational detail view showing the hinged cam-slide, which opens the hinged jaw of the end-sheet gripper mechanism; Fig. 10 is a vertical sectional view taken through the upper portion of the machine as on the line 10—10 of Fig. 6; Fig. 11 is a detail view taken in section as on the line 11—11 of Fig. 10; Fig. 12 is a vertical sectional view taken through the upper portion of the machine as on the line 12—12 of Fig. 6; Fig. 13 is a detail sectional view taken on the line 13—13 of Fig. 12; Fig. 13$^a$ is a detail sectional view taken on the line 13$^a$—13$^a$ of Fig. 13; Fig. 14 is a detail plan view illustrating the hinge-strip cutting mechanism; Figs. 15 and 16 are elevational views in detail illustrating opposite sides of said mechanism; Fig. 17 is a detail elevational view showing the rear side of the registering platform and the clutch-bar associated therewith; Fig. 18 is a sectional view taken on the line 18—18 of Fig. 12; Fig. 19 is a view partly in elevation and partly in section, the sectional portion thereof being taken on the line 19—19 of Fig. 10 and illustrating particularly the reel for hinge-strip fabric and the means for feeding fabric from said reel; Fig. 20 is an end view of the parts shown in Fig. 19; Fig. 21 is a detail sectional view taken on the same line (12—12) of Fig. 6 as the section shown in Fig. 12, said view being of an enlarged scale and illustrating, particularly the registering platform for end-sheet members and the folding-gripper mechanism co-operating therewith, the parts having a relative disposition differing from the relation shown in Fig. 12; Figs. 22, 23 and 24 are detail sectional views similar to Fig. 21 and, together with said Fig. 21, illustrate progressive steps in the operation of the machine; Fig. 25 is a detail sectional view taken on the line 25—25 of Fig. 13; Fig. 26 comprises a group of views diagrammatically illustrative of the three simultaneously operating sheet feeding mechanisms; Fig. 27 comprises a group of views diagrammatically illustrating the three sheet receiving structures upon which the three end-section members are deposited by said feeding mechanisms; Figs. 28, 29 and 30 are enlarged detail sectional views all taken on the same line (10—10) of Fig. 6 as the section shown in Fig. 10 and all illustrating end-sheet elements associated therewith; Fig. 28 particularly illustrating the end-sheet folding mechanism and Figs. 29 and 30 particularly illustrating the carrier rack structure in different positions; Fig. 31 is a detail sectional view similar to Fig. 21, but illustrating that relation of parts assumed immediately prior to the relative disposition thereof as seen in said Fig. 21 and Fig. 32 is a transverse sectional view of a completed end-section of the type formed by my machine.

Reference being had to the drawings, it will be observed that the illustrated embodiment of my machine comprises a structure including various mechanisms arranged longitudinally and transversely thereof. Near the head of the machine and at the back thereof is a mechanism A (Fig. 6) for feeding end-sheets into the machine. Opposite said mechanism A and at the front of the machine is a feeding mechanism B for smudge-sheets. Medially of the machine is a mechanism C for supplying hinge-strips to end-sheets. Near the foot of the machine and at the front thereof is a feeding mechanism D for printed-sections and at the back of the machine opposite said feeding mechanism D is an end-section delivery mechanism E. These five mechanisms are co-ordinated with each other and with gathering, pasting and sealing means, hereinafter particularly described, to provide for the rapid production of book end-sections.

Included in the frame work of the machine is an elongated base 10 (Fig. 1), end frames 11, 12 rising from the head and foot of the base 10 and a horizontal frame-bar 13 secured at its ends against the front sides of the end frames 11, 12. Slightly above the base 10 is a main power shaft 14, the same being journaled near its ends in the end frames 11, 12. Included in a power train at the head of the machine is a large gear 15 (Fig. 6) fixed to the power shaft 14, a dual gear wheel comprising a small gear 16 and a large gear 17 journaled on a stud 18 on the end frame 11 and a combined pulley 19 and small gear 20 freely revoluble on the power shaft. The small gear 16 of said dual gear wheel meshes with the gear 15 and the large gear 17 meshes with the gear 20 on the pulley 19. Power applied to said pulley 19, as through a belt, is transmitted to the power shaft 14 through said described gearing. A fulcrum shaft 21 (Fig. 1) is supported at its ends by the end frames 11, 12 slightly above the power shaft 14 and in parallelism therewith. This fulcrum shaft 21 rockably supports various working parts, which are actuated through the medium of the power shaft 14, as will hereinafter appear. Journaled in the tips of the end frames 11, 12 is a rock-shaft 22 and on the end of said rock-shaft, at the foot of the machine, is a bell crank $a$ (Fig. 5), the arm 23 thereof being connected through a pitman 24 with a crank-wheel 25 on the power shaft 14. This rock-shaft 22 and others now to be described support and co-ordinately move oscillatory gripper arms hereinafter particularly referred to. At the foot of the machine is a second and relatively short rock-shaft 26 (Figs. 3 and 5), the same paralleling the rock-shaft 22 and journaled at one end in the end frame 12 and at its other end in a bracket 27 rising from a frame post 28 seated on the base 10. This rock-shaft 26 has a lever 29 (Fig. 5) depending therefrom, the lower end of said lever 29 being joined through a link 30 with the pendant arm 31 of the bell-crank $a$. With the rock-shaft 26 thus linked to the bell-crank $a$, it will be understood that the two rock-shafts 22, 26 are turned in unison from the power shaft 14. Near the head of the machine (Fig. 1) is a stub-shaft 32, the same being anchored at one end thereof in the tip of an upwardly inclined bracket 33. This bracket is anchored at its lower end to the frame-bar 13 and steadied by the rock-shaft 22, which turns in a bore formed in a boss 33$^a$ medially of said bracket 33. Said stub-shaft 32 carries a journal sleeve 32$^a$, which is reversely rocked with respect to the rocking movement of the rock-shaft 22 by means of a lever 34 rising from said rock-shaft 22, a lever 35 depending from said journal sleeve 32ª and a link 36 joining the ends of said levers.

Having now generally described the main frame work of the machine, the prime movers and the relative locations of the mechanisms A, B, C, D and E, I shall proceed with a more detailed discussion of said mechanisms, explaining in connection therewith the structural make-up and operation of the sheet gathering, pasting and sealing devices.

The feeding mechanism A (Figs. 3, 6 and 7) for end-sheets includes a table 37 supported on legs 38 rising from horizontal frame members 39, and it also includes side guides 40, a back guide 41 and a front guide 42. Inset in the front portion of the table 37, is a lip 37ª which is hinged to allow the forward edge thereof to swing beneath the lower edge of the front guide 42. Pivoted to and depending from the lip 37ª is an actuating rod 43, the lower end of which pivotally joins the rear end of a walking beam 44 traversing the machine and medially supported on a riser 45 having its footing on the base 10. The forward end of the walking beam 44 carries a roller 46, the same bearing beneath and following the surface of a cam 47 on the power shaft 14. Three suction grips 48 each carried by an individual hanger 48ª depending from the underside of the lip 37ª, open through marginal recesses in said lip, each of said grips 48 being connected through a tube 48ᵇ with a suction pump member 48ᶜ. The three pump members 48ᶜ are combined in a unitary pump structure of the conventional plunger type, the cylinders of the structure having a tilting rest on the base 10, the plungers thereof being tied together and reciprocated through an eccentric strap 49 encircling an eccentric 49ᵃ on the power shaft 14. To separate the lower sheets of a pack on the table 37, I direct a nozzle 50 through the lower margin of the front guide 42 and against the front edges of said sheets. Air compressed in a pump b (Figs. 1 and 3) leads to said nozzle 50 through a tube 50ª. Said pump b is of conventional pattern, the same including a plunger receiving cylinder 51 tiltably anchored on the base 10 and a plunger rod 51ª connected with a crank-pin 51ᵇ on the outer face of the gear 17. Depending from the previously described journal sleeve 32ª is a gripper arm 52 having an upper stationary jaw 52ª integral therewith. This stationary jaw 52ª and a lower jaw 52ᵇ hinged thereon constitute a sheet gripper. Linked with an arm 52ᶜ on said hinged jaw 52ᵇ is a rod 52ᵈ reaching upward through a stud 52ᵉ on the gripper arm 52. A spring 52ᶠ, interposed between said stud 52ᵉ and a collar 52ᵍ on said rod 52ᵈ, urges said rod downward and, through said arm 52ᶜ, yieldingly closes the hinged jaw 52ᵇ. The gripper arm 52 being mounted on the journal sleeve 32ª, it is caused to oscillate between sheet taking and sheet depositing positions (dotted lines, Fig. 7). In approaching the former position, a roller 52ʰ on the arm 52ᶜ rides up an inclined cam-slide 53 (Figs. 6 and 9) mounted on a reach 54 extending from the bracket 33 to the front guide 42 of the feeding table 37. Said roller 52ʰ in riding up said cam-slide 53 causes the lower jaw 52ᵇ to open, whereby the bottom sheet of the pack on the table 37, turned down at its forward portion by the downward tipping of the lip 37ª, is received between said separated jaws 52ª, 52ᵇ. Passing over the high end of the cam-slide 53, the roller 52ʰ becomes ineffective and the jaw 52ᵇ closes, whereupon said jaws, now projected into a recess 37ᵇ in the lip 37ª, grasps said downturned edge of said sheet. The cam slide 53 is hinged at its high end to allow the lower end thereof to swing idly upward (dotted lines, Fig. 9), over the roller 52ʰ, upon the return swing of the gripper arm 52. Continuing the return swing of the gripper arm 52 toward the front of the machine (to the left, Fig. 7), the grasped sheet is withdrawn from beneath the pack on the table 37 and finally dropped, upon the opening of the jaw 52ᵇ, which is caused by the impingement of the roller 52ʰ against a second cam-slide 55 fixed to the bracket 33. Falling back of a front guide 56 and on two slightly separated bed plates 57, 57ª, the deposited sheet is acted upon as will later appear.

The feeding mechanism B (Fig. 7) for smudge-sheets includes a table 58 bracketed in front of the frame-bar 13 and in position wherein said bar serves as a front sheet guide. In addition to this bar 13 are companion sheet guides 59, 60 rising from the table 58. A lip 58ª is embodied in the rearward portion of the table 58, as in the instance of the table 37 previously described. Said lip 58ª is hinged to the table 58 and carries suction grips 61, the mouths of which are disposed in recesses cut in the lip. Hangers 61ª under the lip 58ª carry said suction grips, each grip 61 being connected through a tube 61ᵇ with a pump member 61ᶜ (Fig. 1). These pump members 61ᶜ, like the pump members 48ᶜ, have the plungers thereof joined, said plungers being connected through an eccentric strap 62 with an eccentric 62ª on the power shaft 14. The lip 58ª is swung downward and back by means of a rod 63 depending therefrom and fitted at its lower end with a roller 63ª riding a cam 63ᵇ on the power shaft 14, said roller being carried by and guided through the medium of an arm 64, pivoted on the fulcrum shaft 21. The bottom sheet of a pack on the table 58 is separated from the sheets thereabove by means of a nozzle 65 directed through the frame bar 13 and connected through a tube 65ª with the pressure pump b, said sheet having the rearward portion thereof turned down as the suction grips 61 swing downward with the lip 58$^a$. Thus presented, said bottom sheet is grasped and withdrawn by sheet gripping means closely resembling the previously described means for taking end-sheets from the table 58. The said sheet gripping means comprises a gripper arm 66 depending from the rock-shaft 22, said arm having an upper fixed jaw 66$^a$ and a lower jaw 66$^b$ hinged thereon. The latter jaw 66$^b$ is fitted with an arm 66$^c$, said arm being yieldingly depressed by a spring actuated rod 66$^d$ and supplied with a cam roller 66$^e$. In the oscillation of the gripper arm 66, the roller 66$^e$ passes back and forth along the face of a bracket 67 (Fig. 7) traversing the machine. This bracket 67 carries a hinged cam-slide 68 and a fixed cam-slide 69, the same being like the parts 53, 55, above described. The hinged cam-slide 68 co-operates with the rollers 66$^e$ to open the hinged jaw 66$^b$ and to permit the closing of the gripper upon a sheet presented to be fed by the lip 58$^a$, while the fixed cam-slide 69 co-operates with said roller 66$^e$ to open the hinged jaw 66$^b$ and thereby release a sheet grasped by the jaws 66$^a$, 66$^b$. Gripped in said jaws 66$^a$, 66$^b$ a smudge-sheet is pulled from beneath a pile on the table 58 and dropped on a carrier-rack $c$ (Fig. 7), between a back guide bar 70 and a front angle-bar guide 71, said carrier rack $c$ being constructed and operated as and for purposes later explained.

The feeding mechanism D (Fig. 12) located at the foot of the machine and adapted to feed printed-sections, includes a table 72 bracketed in front of the frame-bar 13, which bar serves as a rear guide for printed-sections on said table. This table 72 is constructed like and embodies practically the same equipment as the table 37, 58 previously described. A lip 72$^a$ hinged at the rear of the table 72 is supplied with suction grips 73, the same being connected through tubes 73$^a$ with pump members 73$^b$ operated as a unit through an eccentric strap 74 which encircles an eccentric 74$^a$ on the power-shaft 14. A lip lowering and elevating rod 75 depends from the lip 72$^a$ and is connected at its lower end with a cam roller 75$^a$, riding a cam 75$^b$ on the power-shaft 14, and guided by an arm 76 pivoted on the fulcrum shaft 21. Placed on the table 72 with the folded edges against the guiding frame-bar 13, the bottom printed-section is turned down at its rear portion upon the downward swing of the lip 72$^a$ and thus presented for withdrawal from the table 72. Gripper mechanism is provided for taking printed-sections thus presented and depositing the same, said mechanism being similar to the gripper mechanisms heretofore described. A gripper arm 77 is supplied, the same depending from the rock-shaft 22 and being equipped with a fixed jaw 77$^a$, a hinged jaw 77$^b$, an arm 77$^c$ on the latter jaw 77$^b$, a roller 77$^d$ on said arm and a rod 77$^e$ downwardly pressed by a spring 77$^f$ for depressing the arm 77$^c$ and closing the hinged jaw 77$^b$. A bracket 78 traversing the machine carries a hinged cam-slide 79 and a fixed cam-slide 80 with which the roller 77$^d$ co-operates. These cam-slides 79, 80 are constructed and function like the cam-slides 68, 69 hereinbefore described. Effecting the timely swinging of the hinged jaw 77$^b$, the cam-slide 79 causes the jaws 77$^a$, 77$^b$ to take a printed-section from the table 72 in the forward position of the gripper arm 77, while the cam-slide 80 causes the grasped section to be freed from said jaws in the rearward position of said arm. Falling from said jaws 77$^a$, 77$^b$ a printed section drops onto a registering platform $d$ (Fig. 12). In this position of a printed-section on said platform $d$, a smudge-sheet and an end-sheet, gathered in a manner yet to appear, are gathered with said printed-section.

The mechanism C (Fig. 10), for providing and applying hinge-strips to end-sections includes a spool 81 carrying a roll 82 of linen fabric, said spool being mounted on a spindle 83 journaled at its ends in brackets 83$^a$ rising from the horizontal frame-bar 13. A pair of rocking feed jaws 84, 85 (Fig. 19) draw off the fabric from said roll and present it step-by-step to a knife 86. The lower jaw 84 is formed with end frames 84$^a$ which are hinged on a supporting shaft 84$^b$ carried by hangers 87 depending from transverse beams 88, 88$^a$. The upper jaw 85 is also formed with end frames as at 85$^a$, the two jaws being hinged together by means of a shaft 89 passing through said end frames 84$^a$, 85$^a$, said shaft 89, though free to turn in the end frames 84$^a$ of the lower jaw 84, is secured against turning in the end frames 85$^a$ of the upper jaw 85. An abutment 90 (Fig. 10), angularly adjustable on the shaft 89 and arranged to impinge against the lower jaw 84 is provided to regulate the relative tilting of the end frames 84$^a$, 85$^a$ and the consequent relative throw of the jaws 84, 85 in their opening movement. One end of the shaft 84$^b$ reaches through and projects beyond one of the hangers 87 (Fig. 19) and mounted on said end of said shaft is a bell-crank $e$ (Fig. 20) having an upwardly reaching jaw actuating arm 91, the same being pivotally joined with the end of a shaft 85$^b$ carried in the end frames 85$^a$ of the upper jaw 85. The second arm 92 of the bell-crank $e$ has a link 93 pivoted thereto and rising therefrom. A lever 94 having a slotted pivotal connection between the inner end thereof and the upper end of said link, is fixed medially on a rock-shaft 95 paralleling the frame-bar 13 and journaled in bearings 95$^a$ thereon. The outer end of the lever 94 is joined through a link-rod 96 with a strap 96$^a$ (Fig. 1) encircling an eccentric 96$^b$ on the power shaft 14. Rotation of said eccentric 96ᵇ operates through the link-rod 96, lever 94, link 93 and bell-crank e to rock the jaw assembly back and forth. With the fabric from the roll 82 passed downward and back of the rock-shaft 95 (Fig. 10), thence under a guide-roll 97, thence over the hinge-shaft 89 and between the jaws 84, 85 it will be seen that the rearward throw (to the right, Fig. 10) of the jaw structure will cause a definite measure of fabric to be advanced into the machine and that upon the reverse throw of said jaws 84, 85, the same will open, in so far as is permitted by the abutment 90, and pass freely along the fabric in their return movement preparatory to taking a new grip upon said fabric. The length of the throw of the jaw structure determines the measure of fabric to be fed upon each rocking cycle of said structure and such measure is regulated in the slotted connection between the link 93 and lever 94 (Fig. 20). To this end a pin 94ᵃ, fixed on the lever 94, plays up and down in a slot 93ᵃ in the link 93, the movement of said pin in said slot being limited by means of stops 93ᵇ, 93ᶜ adjustably secured to said link 93 above and beneath said pin 94ᵃ. The upper stop 93ᵇ controls the rearward limit of throw of the jaws 84, 85, and the lower stop 93ᶜ controls the forward throw thereof. Fabric fed by said jaws 84, 85 passes beneath the knife 86, which is pivoted at one end thereof on a bolt 98 in a bearing 98ᵃ (Fig. 16) on the beam 88. Said knife 86, slidably guided at its free end by means of a curved guide 99 anchored at its lower end to the beam 88ᵃ, is equipped at its lower edge with a blade 86ᵃ and at its free extremity with a clip 86ᵇ. Said grip overreaches the edge of said guide opposite the edge thereof adjacent which said extremity of said knife 86 swings. Beneath the knife 86 and mounted at its ends on the beams 88, 88ᵃ is an elongated shearing block 100 with which the blade 86ᵃ of the knife 86 co-acts. Passed over said block 100 and beneath the knife 86, a strip is severed transversely from the fabric upon each depression of said knife. In swinging the knife 86 up and down on its pivot, I employ the rock-shaft 95 (Fig. 19) as the prime mover. Rigidly secured at one end thereof to said rock-shaft 95 is an arm 101 (Fig. 16) having an axial bore in its free end. Telescoped and free to turn in said bore is a rod 101ᵃ, the same being supplied at its outer end with a yoke 101ᵇ having an apertured block 101ᶜ pivotally supported by the arms thereof. A pin 86ᶜ, secured in the forward end of the knife 86, passes through the aperture in said block 101ᶜ and completes the actuating train between said knife 86 and the rock-shaft 95. Upon the turn of said rock-shaft 95 in a direction to return the fabric feeding jaws 84, 85 for a new grip, the arm 101 is depressed and, through the media of the rod 101ᵃ and pin 86ᶜ, the knife 86 is depressed to cut a strip from the fabric previously fed by said jaws 84, 85. To secure the fed fabric during the cutting operation, an elongated binding strip 102 (Fig. 16) is provided. This binding strip 102 is disposed edgewise of the shearing block 100, the lower edge thereof being yieldingly held above said block by means of opposed leaf springs 102ᵃ, fastened to the two beams 88, 88ᵃ, and engaging beneath pins 102ᵇ in said binding strip 102. A depressing lever 102ᶜ, hinged on the bolt 98, is pivoted to the binding strip 102 medially thereof. A leaf spring 102ᵈ secured to the bolt 98 and operating with greater force than the combined strength of the springs 102ᵃ, bears against a pin 102ᵉ on the depressing lever 102ᶜ and, through the media of said pin and the lever 102ᶜ, causes the strip 102 to descend and bear down upon the fabric overreaching the shearing block 100 (Figs. 14 and 16). This action of said spring 102ᵈ obtains at all times, except when the knife 86 is fully elevated, or substantially so, such action of the spring 102ᵈ in said elevated position of the knife being counteracted by means of a lug 86ᵈ on the knife 86 and an abutment screw 102ᶠ on the lever 102ᶜ. Said lug 86ᵈ strikes said screw 102ᶠ in the final stage of the upward swing of said knife 86 and operates, in opposition to the spring 102ᵈ, to lift the binding strip 102, whereupon the springs 102ᵃ come into play and hold the ends of said binding strip clear of the fabric therebeneath. On the inner side of the knife 86, where a clipping (fabric hinge-strip) is left following a cutting stroke of said knife, are a pair of co-operating sealing members, one, a lower base-bar 103, and the other, an upper pressure-bar 104. The fabric, fed from the roll 82 upon each feeding throw of the jaws 84, 85, is projected under the knife 86, as above explained and into position with the advance edge overlying the base-bar 103. Prior to the cutting stroke of said knife 86, an end-sheet, advanced and pasted as will later appear, is brought back to the fabric, one end of said end-sheet, paste treated at its lower margin being lapped over said advance edge of the fabric. The sealing pressure-bar 104, actuated by the knife 86 in its cutting swing, descends upon the lapping end-sheet and fabric and bearing down thereon, prior to the severance of the fabric hinge-strip, completes the joinder of said hinge-strip, with the end-sheet before control of the former is lost in the shearing operation. Medially of the upper edge of the sealing pressure-bar 104 (Fig. 15) is an upright stud 104ᵃ slidable vertically in the end of a bracket 105 secured to the beam 88. A push-pull rod 106, pivoted at its lower end to the tip of the stud 104ᵃ, slides in a frictional bushing 106ᵃ pivotally mounted on a riser 106ᵇ secured to the upper edge of the knife 86. In the initial stage of the downward stroke of the knife 86, the pressure-bar 104 is pressed down upon that portion of an end-sheet lapped over the end of the fabric and is so held during the completion of said stroke of said knife due to the frictional engagement of the bushing 106ᵃ with the rod 106. During the initial stage of the return stroke of the knife 86, the pressure-bar 104 is elevated sufficiently to clear the horizontal path taken by an end-sheet in lapping the fabric, said pressure-bar being so held during the completion of the return stroke of said knife, due to the aforesaid frictional engagement of the bushing 106ᵃ with the push-pull rod 106.

As explained in the foregoing description of the end-sheet feeding mechanism A (Figs. 6 and 7), an end-sheet is taken from the table 37 by the gripper jaws 52ᵃ, 52ᵇ and deposited upon the bed plates 57, 57ᵃ. In its fall to the bed plates 57, 57ᵃ the end-sheet drops between an adjustable front guide 56 and an adjustable rear guide 107, the former being located on the bed-plate 57 and the latter slidably supported on edge on the bed-plate 57ᵃ and equipped with set-bars 107ᵃ adjustably clamped in the supporting frame 39 for the table 37. From position on the bed-plates 57, 57ᵃ, the end-sheet is caught by a pusher-blade 108 and shoved sideward toward the foot of the machine. Register wheels 109 mounted on a shaft 110 extend upward through apertures 109ᵃ in the bed-plate 57 and engaging the underside of the end-sheet thereon, urge the rear edge of the end-sheet against the rear guide 107. Said end-sheet in its travel toward the foot of the machine is treated with paste at both ends thereof, a paste wheel 111 being arranged to engage the upper margin at the rear end of the end-sheet and a paste wheel 112 arranged to engage the lower margin at the front end thereof. Pushed past said paste wheels 111, 112, the advance edge of the end-sheet engages an adjustable side guide 113 (Figs. 6 and 10). Stopped by said guide 113, the end-sheet rests temporarily with said latter paste treated margin thereof lapping the advance edge of the hinge-strip fabric on the sealing bar 103 (Figs. 28 and 10). During this temporary dwell of the end-sheet a strip is severed from the fabric drawn from the roll 82 and the said end-sheet sealed thereto as hereinbefore described. The pusher-blade 108 is secured to a block 114 (Figs. 7 and 2) reciprocable on a guide-rod 115 held at its ends in the machine frame. Inclined downwardly toward the head of the machine is a bracket 114ᵃ, the same being connected through a link 116 with the upper end of an actuating lever 117. The lower end of said lever 117 is adjustably clamped on a journal sleeve 118 (Figs. 7 and 11) carried by a stud 119 in a bracket 120 mounted on the frame post 28. Depending from the journal sleeve 118 and adjustably clamped thereto is a lever 121, the oscillation of which is effected, as will later appear, to rock the lever 117 to and fro and thereby impart the desired reciprocatory movement to the block 114 and pusher-blade 108 thereon. Depending from the block 114 is an arm 122 (Fig. 7), the lower end of which is connected with the lower reach of a chain 123. This chain 123 runs over a guiding sprocket 124 on a bracket 125 depending from the machine frame and over a driven sprocket 126 mounted to turn on a shaft 127 revoluble in bearings 128 on the beam 88ᵃ. Said sprocket 126 is equipped with a spring pressed pawl 126ᵃ (Fig. 8), which engages a ratchet wheel 126ᵇ fixed to said shaft 127 and covered by a guard 126ᶜ. At the inner end of the shaft 127 is a gear 129, the same meshing with a gear 130 on a shaft 131 upon which the paste wheel 112 is secured. This paste wheel 112 is encased, except at the extreme upper portion thereof in a paste box 112ᵃ, said upper portion of said wheel being disposed, as aforesaid, in position to apply paste to the lower margin of an end-sheet at the forward end thereof. A pulley 132 fixed to the shaft 127 turns beneath a pulley 133 on a shaft 134 to which the paste-wheel 111 is fixed, said pulleys 132, 133 being connected through a belt 135. The paste-wheel 111 is closely encased in a paste box 111ᵃ, except at the extreme lower portion thereof, said portion of said paste-wheel, being located as hereinbefore indicated to apply paste to the upper margin of an end-sheet at the rear end thereof. These paste-wheels 111, 112 are turned, through the mechanism just described, in the direction and at the same speed as the movement of an end-sheet while it is being pushed sideward by the pusher-blade 108. This arrangement provides for the uniform pasting of an end-sheet without danger of buckling the same as it is pushed along toward the foot of the machine. Being ratcheted to the shaft 127, the driving sprocket 126 remains stationary, while the pusher-blade 108 returns toward the head of the machine for a new end-sheet. With said sprocket 126 stationary, the paste wheels 111, 112 also remain stationary, the result being that no paste is fed from the paste boxes 111ᵃ, 112ᵃ except when a sheet to be pasted by the paste-wheels 111, 112 is passing the same. At the rear of the machine and fixed to the shaft 127 is a crank 127ᵃ. This crank is used to turn the paste-wheels 111, 112 preparatory to starting the machine and as a precaution against having an insufficient quantity of paste on said wheels at the time they are encountered by an end-sheet.

Means, now to be described, fold an end-sheet and hinge-strip assembly medially thereof to bring the hinge-strip against the opposite pasted margin of the end-sheet. In addition, said means seals the ends of the folded assembly and passes said assembly on to a transfer rack, where a smudge sheet is supplied thereto. A pair of co-acting, folding-sealing rollers 136, 137 are arranged longitudinally of the machine between the knife 86 and the guide-bar 107 (Fig. 10). The upper portions of these rollers lie just beneath the underside of an end-sheet resting at its rearward end on the bed plate 57ª and at its forward end on the base-bar 103. The roller 137 is mounted on a shaft 138 journaled at its ends on the beams 88, 88ª, the roller 136 being mounted on the shaft 110, which carries the register rollers 109 (Figs. 7 and 6), and, like the shaft 138 is journaled on the beams 88, 88ª. A gear 137ª on the roller 137 meshes with a gear 136ª on the roller 136 and also meshes with a driving gear 139 fixed on a counter-shaft 140 journaled at its ends in chute frames 141 depending from the beams 88, 88ª. The end of this counter-shaft, toward the head of the machine, is supplied with a sprocket 142, a chain 143 being employed to gear said sprocket 142 to a sprocket 144 fixed to a second counter-shaft 145 journaled in bearings 145ª, 145ᵇ respectively mounted on the bracket 120 and on the end frame 11. A sprocket 146 fixed to the counter-shaft 145 is geared through a chain 147 with a sprocket 148 on the hub 16ª (Fig. 6) of the smaller dual gear 16 on the stub shaft 18. Power derived from said gear wheel 16 is transmitted through said chains, sprockets and counter-shafts with the result that the rollers 136, 137 are turned toward each other, as indicated. Suspended over the rollers 136, 137 (Fig. 10), is a folder-blade 149, the same being carried at the inner extremities of arms 150 secured to a shaft 151 rockably supported by the beams 88, 88ª. A lever 150ª (Fig. 7) depending from one end of this shaft 151 is joined through a link-rod 152 with a lever 153 rising from a sleeve 154 (Fig. 1) on the fulcrum shaft 21. Depending from said sleeve 154 is a lever 155 (Fig. 7) carrying a roller 155ª which follows a cam 156 on the main power shaft 14. A spring 157, stretched between the lever 150ª and a bracket 158 acts through the lever 150ª, link-rod 152, and levers 153, 155 to hold said roller upon said cam 156. With the roller 155ª riding the high portion of the cam 156, the folder-blade 149 is held clear of the rollers 136, 137 (Fig. 10) against the action of the spring 157, but when said roller 155ª drops into the depression in the cam 156, the spring 157 acts to depress the folder-blade 149 and to cause the same to first initiate the folding of an end-sheet therebeneath and then feed said end-sheet, folded edge first, into the bight of said rollers. Immediately following the downward feeding throw of the folder-blade 149, said blade is quickly retracted to avoid interference with the end-sheet and hinge-strip assembly as it passes between said rollers 136, 137. Star wheels 159 freely revoluble on a shaft 159ª overreaching the roller 137 keep the rear portion of an end-sheet from engagement with the folder-knife 149 and thereby guard the pasted margin of said end-sheet. A guard-finger 160 (Fig. 6) overreaching the roller 136 and functioning in the manner of said star-wheels 159, keeps the front end of an end-sheet and hinge-strip assembly from engagement with said folder-blade 149. As the folded end-sheet and hinge-strip assembly leaves the rollers 136, 137, the pasted margin of the end-sheet is joined with and sealed to the adjacent margin of the hinge-strip by said rollers. Beneath the rollers 136, 137 (Fig. 10) are a pair of elongated pulleys 161, 162 about which a number of apron belts 163 are placed. Traversing the upper reaches of these belts 163 is a roller 164, the same having a gear 164ª thereon meshed with a gear 161ª on the pulley 161, said latter gear being also intermeshed with the drive gear 139. Guide-bars 165, rising between the apron belts 163, direct a folded end-sheet and hinge-strip assembly from the rollers 136, 137 into the bight between the roller 164 and apron belts 163 and said latter elements 164, 163 in addition to further sealing the united ends of said assembly, deliver it forwardly over a rear angle-bar guide 166, upon horizontal tines 167 of a transfer rack $f$ and against a front guide 168. This rack has for its support an inverted T shaped hanger 169 (Fig. 1) suspended from the frame bar 13. Said transfer rack $f$ includes horizontal guide rods 170 (Figs. 6, 10 and 11) fixed in the head of the hanger 169 and extending outward from the machine, the extreme outer ends of said rods being joined by a tie-bar 170ª. The tines 167 of this transfer rack $f$ are secured at their forward ends in a head-block 171 slidable on the guide-rods 170, two of said tines 167 being projected through apertures formed in the head of the hanger 169 and all of said tines being projected through apertures formed in the front guide-bar 168 to receive said tines. A reach 172 paralleling the guide-rod 170 nearest the head of the machine, is fixed at its inner end to the head-block 171 and is supplied with a bearing 172 slidable on said guide-rod 170. A link 173 connects the outer end of said reach 172 with the upper end of a lever 174 rising from and pivoted on a bracket 175 secured to a frame post 176. A roller 174ª on said lever 174 follows a cam 177 on the main power shaft 14, said roller being held against said cam through the tilting of said lever 174 by means of a weight 178 carried at the free end of a branch 174ᵇ of said lever. A guide strip 179 mounted upon the reach 172 and head-block 171 extends inwardly of the machine in the direction of the tines 167, the lower edge of said guide strip 179 being disposed slightly above the plane of the tines 167. This strip 179 is turned upward at its inner extremity to guide a folded end-sheet and hinge-strip assembly, as it issues from the apron belts 163 and roller 164, whereby the passage of said assembly along the tines 167 and into position with the forward folded edge against the front guide 168 is assured. The cam 177 co-acting with the roller 174ᵃ on the lever 174 causes the tines 167 to be reciprocated, the forward stroke thereof resulting in the stripping of sheets therefrom by the front guide 168.

Co-operating with the transfer rack $f$ are a pair of carrier racks $c$, $g$ (Fig. 2) jointly reciprocable longitudinally of the machine. Smudge-sheet supporting fingers 180 of the rack $c$ move in a plane above the tines 167 of the transfer rack $f$, while sheet supporting slats 181 of the rack $g$ travel in a plane beneath said tines 167. The fingers 180 of the rack $c$ receive a smudge-sheet as it falls from the jaws 66ᵃ, 66ᵇ (Fig. 7) between the back guide bar 70 and the front angle-bar guide 71. Moving toward the foot of the machine, the rack $c$ carries an acquired smudge-sheet over the tines 167 of the transfer rack $f$ upon which a folded end-sheet and hinge-strip assembly has passed. The fingers 180 being only slightly above the tines 167, it is at times necessary to depress that portion of said assembly nearest the head of the machine to avoid interference between the same and the fingers 180 of the smudge-sheet rack $c$. A simple paddle 182 accomplishes this purpose (Fig. 11). Said paddle is carried on a pintle 182ᵃ journaled in the front guide 168, said guide, in turn, being supported on a bracket 168ᵃ reaching inwardly of the machine from the head of the hanger 169. Weighted off center with a weight 182ᵇ, the pintle 182ᵃ normally rests with the paddle 182 standing in a vertical plane and with the upper margin thereof in the path of the outermost finger 180. Engaged by and held depressed beneath this finger 180 the paddle 182 tilts and holds down the margin of the folded end-sheet and hinge-strip assembly and thereby keeps the fingers 180 of the smudge-sheet rack $c$ from interferring with or disturbing the position of said assembly on the transfer rack $f$. In approaching position over the transfer rack $f$, the advance edge of a smudge-sheet on the rack $c$ engages the lower end of an upwardly tiltable stripper-pawl 183 (Figs. 2 and 11). This pawl is hinged on a pintle 183ᵃ reaching forward from the angle-bar guide 166, a stop-pin 183ᵇ being also anchored in said guide and limiting the downward swing of said pawl 183. With the smudge-sheet backed against the sheet abutment 184 on the carrier rack $c$, the advance edge of said sheet elevates and passes beneath said pawl 183. Movement of the smudge-sheet beyond the pawl 183 is followed by the dropping of said pawl behind the trailing edge of said sheet, said pawl operating in such position to push the smudge-sheet from the fingers 180 of the carrier rack $c$ upon the return of said rack toward the head of the machine for a new smudge-sheet. Dropping from the carrier-rack $c$, a smudge-sheet falls upon the folded end sheet and hinge strip assembly supported by the transfer-rack $f$. As the smudge-sheet rack $c$ resumes its sheet receiving position, the carrier rack $g$ takes position beneath the transfer rack $f$. The forward throw of the transfer-rack $f$, through the action of the cam 177, is attended with the stripping by the guide-bar 168 from the tines 167 of the smudge-sheet and the folded end-sheet and hinge-strip assembly gathered on said tines. Dropping from the tines 167 said gathered sheets fall upon the slats 181 of the carrier rack $g$. To keep said gathered sheets together in their fall and to assure the positioning thereof with uniform accuracy upon the carrier rack $g$, I provide a fly 185, which drops upon said sheets and hastens their descent to the slats 181 of said carrier rack $g$. This fly 185 is formed with a shank 185ᵃ pivoted to the head of the hanger 169, said shank having an upwardly reaching branch 185ᵇ thereon. A roller 186 revolubly secured to said branch 185ᵇ rides upon the upper cam-like edge of the guide strip 179, said edge being depressed at the inner extremity of said strip 179. With the roller 186 riding said cam-like edge of said strip 179, the fly 185 is held in upwardly tilted, inoperative position (Fig. 10), except when said depressed portion of said edge is moved beneath said roller 186 upon the forward thrust of the transfer rack $f$, at which time the fly 185 is permitted to swing downward by gravity and carry with it the sheets just stripped from said rack $f$.

Following the stripping of its load to the lower carrier rack $g$, the transfer rack $f$ is again thrust inward to receive a new folded end-sheet and hinge-strip assembly, and the carrier rack $c$ again approaches the transfer rack $f$ with a new smudge-sheet. Contemporaneously with this feeding movement of the upper carrier rack $c$, the lower carrier rack $g$, bearing the gathered smudge-sheet and the folded end-sheet and hinge-strip assembly previously deposited thereon from the transfer rack $f$, moves toward the foot of the machine and into position with the slats 181 superimposing a printed section fed to the registering platform $d$ (Figs. 12 and 31). The carrier racks $c$, $g$ have as a support therefore a pair of rails 187 anchored at their ends in the end frames 11, 12. The upper or smudge-sheet carrier rack $c$ includes a horizontal web 188 formed with sleeves 188ᵃ (Fig. 11) at the edges thereof, said sleeves being slidable on the rails 187 and also includes a carriage block 189 rising from said web 188 (Fig. 7). Near the upper edge of this carriage block 189, the butts of the fingers 180 are secured, the upper margin of said block forming the sheet abutment 184 hereinbefore referred to. The lower carrier rack g includes a carriage block 190 formed with sleeves 191 thereon, said sleeves being slidable upon the rails 187. Traversing the carriage block 190 and pivoted thereto at the forward end of said block is a slat supporting bar 192 to which the butts of the slats 181 are secured. Said slat supporting bar 192 normally slopes downward from its inner end, the slats 181 being correspondingly sloped transversely (Figs. 1, 13ª, 30 and 31). Being hinged, however, at its high outer end on a pivot 192ª on the carriage block 190, the inner end of the slat supporting bar 192 is free to rise to permit of the swinging of the slats 181 into a horizontal plane, as is effected by the registering platform d in a manner soon to appear. The carriage blocks 189, 190 are secured one to the other in spaced relation by means of a tie-rod 193 (Figs. 2 and 11). A link 194 pivoted at one end to a lug 195 on the carriage block 190 has a slotted pivotal connection with the upper end of a lever 196 rising from the base 10 of the machine. This lever 196, which operates to reciprocate the carrier racks c, g and the lever 117 which reciprocates the end-sheet pusher-blade 108 are rocked to and fro by power derived from a bevel gear 197 (Fig. 2) mounted on the post 176 and meshing with a companion gear 198 on the main power shaft 14. A shaft 199, keyed to the bevel gear 197, is journaled in said post 176 and has a crank arm 200 fixed to the inner end thereof, said crank arm being connected with a link 201 to the lever 196 medially thereof. A bell-crank h hinged on a riser 202, on the base of the machine, has one arm 203 thereof connected through a link 204 with an upright extension 201ª on the link 201. The second arm of said bell-crank h is joined through a link 205 with the lower end of the lever 121.

During its advancement on the carrier rack c, a smudge-sheet is pasted along its lower margin at the rear side thereof by means of a paste-wheel 206 (Figs. 1, 2, 7 and 11). Also, during the advancement of a gathered smudge-sheet and end-sheet assembly on the carrier rack g, the pasted portion of the smudge-sheet is sealed down upon the hinge-strip of said assembly and the lower margin of the end sheet beneath said hinge strip is pasted. This latter sealing and pasting operation is effected by a paste wheel 207 and a complementary idler sealing wheel 208 (Figs. 1 and 2). The paste-wheel 207, mounted on a shaft 207ª, turns in a paste-box 207ᵇ, said shaft 207ª being equipped with a driving sprocket 210 and with a pulley 211. The pulley 211 carries a belt 212 reaching toward the head of the machine to the pulley 209 and the sprocket 210 carries a chain 213 reaching in the same direction to an idler sprocket 214 journaled at the head of the machine. A U-shaped arm 215 (Fig. 7), clearing the longitudinal frame bar 216 upon which the paste-boxes 206ᵇ, 207ᵇ and other parts are supported, is secured at its outer end to the carriage rack c and at its inner end to the upper run of the chain 213. This U-shaped arm 215, carried by said reciprocating carriage rack c imparts a reciprocating movement to said upper run of said chain 213. Thus, during the sheet carrying throw of the smudge-sheet rack c, the paste-wheel 206 is turned in the direction at the same speed as the advancing smudge-sheet, whereby the same is pasted without danger of the buckling thereof by said paste-wheel 206. Thus also, during the sheet advancing throw of the carrier rack g, the paste-wheel 207 is appropriately turned to effect its said purpose without the buckling of sheets acted upon thereby. The sprocket wheel 210 is ratcheted upon the shaft 207ª in the same manner as the sprocket wheel 126 (Fig. 8) is ratcheted upon the shaft 127. This ratcheting feature avoids the reverse rotation of the paste-wheels 206, 207 as the carrier racks c, g return to starting positions, the former to receive a fresh smudge-sheet from the feeding mechanism B and the latter to receive gathered sheets from the transfer rack f. A keeper 217 (Fig. 2) complementing the paste-wheel 206, insures the contact of a smudge-sheet with said paste-wheel and the consequent pasting of said sheet. The idler wheel 208, complementing the paste-wheel 207 not only insures contact of the lower margin of an end-sheet with said paste-wheel 207, but also seals a previously pasted smudge-sheet to the upper margin of the end-sheet assembly surmounted by said pasted sheet.

The slat supporting bar 192 (Fig. 13), of the lower carrier rack g has a gripper rod 218 journaled thereto and extending along the side thereof. Overreaching two of the slats 181 are a pair of grippers 219, said grippers being fixed to the said gripper rod. At the outer end of the gripper rod 218 is an actuating dog 220 provided to turn the gripper rod 219 and lift the tips of the grippers 219 from the slats 181 against the action of a gripper closing spring 221 (Fig. 2), which is interposed between the carrier block 190 and a lug 222 (Fig. 13) secured to said gripper rod 218. Mounted on the slat supporting bar 192 are adjustable register guides 223 (Figs. 12 and 13ª). The sheet engaging portions of said guides 223 rise above the upper faces of the slats 181, while the similar portions of the guides 223 are pendant, the same reaching downward far enough to engage a printed-section on the registering platform d. In the position of the lower carrier rack g beneath the transfer rack f, the free end of the dog 220 is elevated by engagement with a cam bracket 224 (Figs. 1 and 11) rising from the fulcrum shaft 21.

This relation of said dog 220, wherein the grippers 219 are open, is maintained by said bracket 224 during the initial stage of movement of the carrier rack g toward the foot of the machine. While said grippers 219 are thus held open and during said initial movement of said rack g, a hinged, depending jogger 225 (Fig. 2) yieldingly engages the advancing edges of the sheets (folded end-sheet and hinge-strip assembly and smudge-sheet) on the slats 181 and backs said sheets against the register guides 223. Following such registration of said sheets and before the same are presented to the paste-wheel 207 and complementary wheel 208, the dog 220 slides from the top of the cam bracket 224, thus permitting the spring 221 (Fig. 2) to swing the grippers 219 down upon the sheets on the slats 181 and thereby clamp said sheets against said slats. After the sheets on the carrier rack g have passed the paste-wheel 207 and as said rack reaches position (Fig. 13) with the slats 181 superimposing the register platform d, the dog 220 engages a cam bracket 226 (Figs. 1 and 13) rising from the fulcrum shaft 21, such engagement of said dog with said bracket causing the grippers 219 to open. As the rack g moves into its extreme feeding position, the depending register guides 223 engage the printed-section on the platform d beneath said rack, the result being that the edge of said printed-section and the edges of the sheets on the rack g remote from the foot of the machine, are registered. At times it is desirable to register the edge of a printed-section and the edges of sheets on the rack g, nearest the foot of the machine, such registration being effected by relative adjustment of the register guides 223 to accord with the relative dimensions of said sheets longitudinally of the machine. To aid in effecting registration of said sheets, I provide an adjustable end gauge 227 (Fig. 13) against which the leading edge of a printed section and superimposed sheets on the rack g are pushed.

The registering platform d upon which the printed sections are severally deposited by the feeding mechanism D (Fig. 12), includes an inner bed-plate 228 and a forward reciprocating register plate 229. A spindle 230 (Figs. 1 and 13) secured at the butt thereof to the end frame 12 and reaching horizontally toward the head of the machine is braced at its tip by means of a supporting bracket 231 rising from the fulcrum shaft 21. Journaled on a reduced portion of said spindle 230 is a sleeve 232 and depending from said sleeve is an arm 233 (Fig. 12) fitted at its lower end with a roller 234 following a cam 235 on the power shaft 14. A supporting reach 236 secured to a flange 232ª on the sleeve 232 and extending rearwardly of the machine carries a bracket 236ª at its free end, said bracket extending transversely of said reach and longitudinally of the machine. The inner bed-plate 228 of the registering platform d is mounted on the reach 236 and bracket 236ª, and said reach in turn rests upon the inner rail 187, except during that time when the roller 234, riding the high portion of the cam 235 swings and holds the reach 236 in elevated position (Fig. 21). The register plate 229 is hinged at its forward edge to the upper ends of a pair of arms 237 rising from a sleeve 238 on the fulcrum shaft 21, which sleeve is formed with a depending arm 239 carrying a roller 240 following a cam 241 on the power shaft 14. The action of said cam 241 causes the register plate 229 to move backward and forward (to the right and to the left, Fig. 12). Said plate 229, during such reciprocation thereof, slides at its rear edge upon the reach 236, and, due to its hinged connection with the arms 237, swings up and down with said reach 236. An angle bar gauge 242, adjustably secured to the register plate 229 supplies a front guide for printed sections as they are fed to the registering platform d by the mechanism D, and also acts as a register gauge not only for a deposited printed section, but for sheets carried by the slats 181 in position superimposing said printed section.

Fingers 243 (Figs. 12 and 13), are secured to a finger-rod 244 journaled in ears 245 rising from the base flange of the angle-bar gauge 242. An actuating rod 246 pivoted to an arm 247 on said finger-rod 244 reaches forwardly of the machine through an eye 248 on a bracket 249 mounted on the forward end of the reach carried by the flange 232ª. Stops 250 are adjustably fixed to the actuating rod 246 at either side of the eye 248, a spring 251, encircling said rod 246, being interposed between the forward stop 250 and said eye 248. The actuation of the fingers 243 by said rod 246, during the rearward thrust of the register plate 229, results in the yielding application of the tips of said fingers 243 to the uppermost sheet on the rack slats 181 (Fig. 21) and, during the forward thrust of said plate 229, results in the return of said fingers 243 into upright inoperative positions (Fig. 12). A pair of guards 252 rising from the upright flange of the angle-bar gauge 242 between the fingers 243, and turned forwardly at their upper end prevents the trailing side of a printed-section from touching the fingers 243 as said section is being fed to the platform d. Prior to the clamping down of the fingers 243, the forward edge of the sheet assembly on the rack slats 181 properly should be positioned against the upright flange of the angle-bar gauge 242 as the lower printed-section inevitably must be, after the rearward thrust of said gauge 242 has been effected. I provide for so adjusting such sheet assembly in the event that its forward edge has not been properly registered with the printed-section therebeneath in the gathering process. A rod is bent to form two branches 253, 253ª (Fig. 12) extending rearwardly from a shank 253ᵇ (Fig. 6), which is hinged horizontally in an ear 254 secured to the rear side of the horizontal frame-bar 13. The branch 253, riding a roller 255 on the fixed jaw 77ª of the printed-section gripper mechanism, is yieldingly held against said roller by means of a spring 256 held by a pin 257 in position interposed between said branch 253 and a bracket 258 on the frame-bar 13. The branch 253ª carries a block 259 (Fig. 12) at the free end thereof, a finger 260 being slidably supported in said block and free to settle by gravity or to rise in the block under slight pressure. The branch 253 co-operates with the roller 255 to lift the finger 260 during the rearward swing of the gripper arm 77 and to permit the depression of said finger, under the action of the spring 256, during the forward swing of said gripper arm. Moving in its downward forward path, said finger 260 engages the top of the sheet assembly on the rack slats 181 and yieldingly urges the same, front edge foremost, against the angle-bar gauge 242. During the rearward feeding swing of the gripper arm 77, the finger 260 is carried upward and out of the way of the sheet last adjusted thereby. At the rear of the registering platform $d$ is a rear guide strip 261 (Fig. 31) the same being secured at its ends to brackets 262 rising from the frame-bar 216. This guide strip 261 provides an abutment for the rear edge of a printed-section side registered, as above explained, by the register plate 229 and front angle-bar gauge 242 thereon. Above said guide-strip 261 and also mounted on the brackets 262 is a fixed clutch-bar 263, the lower edge thereof being knurled or otherwise roughened to effectively engage a sheet of paper. Understanding now that the free rearward side of the hinged registering platform $d$ swings up and down beneath the lower edge of the clutch-bar 263, and having noted that the carrier rack $g$ is swung upward on its forward pivot by said platform $d$, it will be understood (Figs. 31, 21 and 22) that an upward swing of the platform $d$ by the action of the cam 235 causes the sheets on the rack $g$ and the printed-section on the platform $d$ to be gripped together between the clutch-bar 263 and the rear margin of the bed-plate 228 of the platform $d$. This sheet securing action of the clutch-bar 263 and platform $d$ is supplemented by the action of abutment springs 264, 264ª mounted on pins anchored on the clutch-bar 263. The depending end of the spring 264 (Fig. 17) is engaged by the extended end of the rear slat 181, while the depending end of the spring 264ª is engaged by the rear gripper 219 on the carrier rack $g$, the combined force of said springs serving to yieldingly oppose the upward swing of the support bar 192 hinged to the carrier rack $g$ and thereby cause the printed-section on the platform $d$ to be pinched between said platform and said rack $g$. To further supplement the grip of the platform $d$ and clutch-bar 263 on the gathered sheets, I employ a folder-bar 265 and co-operating clutch-feet 266 (Figs. 17 and 21). The folder-bar 265, carried by the bracket 236ª on the platform $d$ is formed with trunnions at its ends and at the bottom thereof, said trunnions being journaled in rearwardly projecting ears 236ᵇ on said bracket 236ª. Springs 265ª encircling said trunnions yieldingly hold the folder-bar 265, free edge uppermost, and slightly inclined rearwardly away from the bracket 236ª. A marginal depression formed in the rear side of the folder-bar 265 provides a sharp corner over which sheets are turned, as will soon appear. The clutch-feet 266, spaced apart along the rear side of the clutch-bar 263 (Figs. 17 and 21) slide vertically in upper and lower guides 267 and 268, said feet being yieldingly depressed to their lowermost limit by means of springs 269 bearing upon the upper ends thereof. In the rearwardly inclined position of the folder-bar 265, the upper clutching edge thereof co-operates with the bases of the clutch-feet 266, and effects a grip between said folder-bar 265 and feet 266 upon the sheets also grasped, as above noted, between the platform $d$ and clutch bar 263. In the final stage of the upward swing of the platform $d$, the feet 266 yield to the pressure of the folder-bar 265. A pin 270 (Figs 17, 21 and 25) vertically slidable in the clutch-bar 263 also yields to the platform $d$. This upward yielding movement of said pin is resolved, through a shoulder-pin 270ª (Fig. 25) and a crank 271, into a turning movement imparted to a semi-cylindrical rocker member 271ª bearing said crank and journaled at its ends in sub-bracket pieces 263ª for the clutch-bar 263, said rocker member 271ª being yieldingly acted upon by a spring 272 to depress said pin 270. The flat side of the rocker member 271ª overlies a set of pendant fingers 273 hinged in the guides 267, the lower ends of said fingers depending slightly beneath the lowermost level of the bases of the clutch-feet 266. Swung forwardly through the action of the rocker-member 271ª and its actuating pin 270, upon the upward swing of the platform $d$, the fingers 273 operate upon the sheets on the rack $g$ turning the rear marginal positions thereof downward over the rear edge of a printed-section held therebeneath on the platform $d$ and over the folding corner of the folder-bar 265 (Fig. 22). The end-section delivery mechanism E, next to be described, includes a folding-gripper $e'$ that folds said downturned marginal portions of said upper sheets beneath the printed section superimposed thereby, thus effecting a final joinder of the elements of an end-section. Thereafter, and following the downward swing of the platform $d$, said folding-gripper $e'$ takes the assembled end-section (Fig. 24) from the position wherein the final gathering and registration of the elements of the end-section are effected.

The folding gripper $e'$ of the end-section delivery mechanism E includes a pair of gripper arms 274 (Figs. 3, 12 and 13) depending from the rock-shaft 26, said arms 274 being braced by means of an intermediate arm 274$^a$, also depending from said rock-shaft 26 and tied to the gripper arms 274 through a cross-brace 274$^b$. Lending rigidity to the bracketed end of the rock-shaft 26 is a bracing link 275 tying said rock-shaft 26 to the rock-shaft 22. A fixed upper jaw-plate 276 is secured beneath forwardly reaching lugs 277 near the lower ends of the gripper arms 274 (Figs. 13 and 21). A shaft 278 journaled in the lower ends of said arms has plate supporting brackets 279 secured thereto and upon which is fastened a movable lower jaw plate 280. Rearwardly extended arms 281 fixed to the shaft 278 have pivoted thereto, at their free ends, upwardly extended rods 282. One rod 282 is slidably guided in an ear 282$^a$ on one gripper arm 274 and the other rod is similarly associated with the other gripper arm. Each rod 282 has an individual depressing spring 282$^b$ encircling the same and interposed between its respective guiding ear 282$^a$ and a stop 282$^c$ on said rod 282. These springs 282$^b$, operating through the rods 282, arms 281, and shaft 278 act to close the lower jaw plate 280 against the upper jaw plate 276. The arm 281, adjacent a bracket 283 extending rearwardly from the end frame 12, carries a roller 284 at its free end, said roller being adapted to co-operate with a tiltable track-bar 285 (Fig. 25) fulcrumed on a pintle 285$^a$ supported by the brcket 283. At the forward end of the track-bar 285 is a trigger 286 hinged at its upper end to the bracket 283 and supplied at its lower end with a catch 286$^a$. A spring 287 stretched between the lower end of the trigger 286 and an anchor screw 288 on the bracket 283 yieldingly holds the trigger 286 in position (solid lines, Fig. 25) with said catch supporting the forward end of the track-bar 285. Passing the upper track surface of the bar 285 during the final stage of the forward swing of the folding-gripper $e'$, the roller 284 is elevated against the action of the springs 282$^b$ by that portion of the track surface forwardly of the pintle 285$^a$, whereby the lower jaw plate 280 is opened (Fig. 22). Continuing forwardly the roller 284 strikes an adjustable abutment screw 286$^b$ in the trigger 286 with the result that the trigger is thrown forward (dotted lines, Fig. 25) and the catch 286$^a$ thereon released from the track-bar 285. Unsupported by said catch 286$^a$, the forward end of the track-bar 285 swings downward against a stop-pin 289, thus permitting the lower jaw plate 280 to close. Upon the return rearward swing of the folding-gripper $e'$, the roller 284, in passing rearwardly of the pintle 285$^a$ tips the track-bar 285 back into latched position (Fig. 25). Continuing rearwardly the folding-gripper $e'$ carries the grasped end-section to point of discharge, where the roller 284 strikes an abutment cam 290 on the bracket 283 and opens the lower jaw plate 280. Slidably surmounting the upper gripper plate 276 (Figs. 13, 21 and 22) is an ejector-head 291 provided with a stud 291$^a$ extended rearwardly thereof. This stud 291$^a$ slides in a guide-bearing 292 secured to a yoke $k$ (Fig. 13), forward extremities of branches 293 of said yoke being secured to the upper face of the fixed jaw plate 276. The shaft 278, passing through, though free to turn, in the branches 293 of said yoke $k$ aids the jaw plate 276 in supporting the yoke. The ejector-head 291 and the upper and lower jaw plates 276, 280, are formed with registered kerfs in their forward edges to receive a plurality of ejector-fins 294. A pintle 295 common to all of the ejector-fins 294 and passing longitudinally through the ejector-head, pivots said ejector-fins to said head. Each ejector-fin 294 has a depending lug 294$^a$ slidable in its respective kerfs in the upper and lower jaw plates 276, 280 and also has an ear 294$^b$ rising from its upper edge and at the rear thereof. A rod 296 (Fig. 13) passing through the ears 294$^b$ of said fins 294 carries the forward ends of guide-pins 297, the rear ends of which are slidably supported in rests 298 rising from and secured to the back of the ejector-head 291. Springs 298$^a$ encircling said guide-pins 297 and interposed between the heads thereof and said rests 298 yieldingly hold the lower edges of the fins 294 down upon the fixed upper jaw plate 276 and permit of the slight upward tilting of the forward ends of said fins 294. As will be seen in Fig. 22, the curved tips of the fins 294 strike the rear side of the clutch-bar 263. This engagement of the fins 294 with the clutch-bar 263 prior to the completion of the forward stroke of the gripper-arms 274 causes the retraction of the ejector-head 291 with the result that the ejector-lugs 294$^a$ on the fins 294 are carried to their rearward, jaw clearing positions. The ability of the fins 294 to yieldingly tilt saves said fins and other parts against injury under adjustments not precisely accurate. An adjustable abutment screw 299 (Fig. 13) threaded in a boss 299$^a$ on the lug 277 of one of the gripper arms 274 is arranged to strike a pendant arm 300 (Figs. 17, 22 and 23) hinged on the rear side of the clutch-bar 263. This arm 300, swung forward by the abutment screw 299 engages the upper edge of the folder-bar 265 on the platform *d* and swings said bar 265 forwardly ahead of the lower jaw plate 280. Following beneath the folding corner of the folder-bar 265 the forward edge of the lower jaw plate 280 meets the portions of the sheets previously turned downward by the fingers 273 and bends them forward under the printed section superimposed by said sheets.

Simultaneously, the upper jaw plate 276 overreaches the upper margin of the end-section. The closing of the gripper, now occasioned by the upward swing of the lower jaw plate 280 as the track-bar 285 is released by the trigger 286, results in the gripping of the end-section by said jaw-plates 276, 280. The last pasted margin of the end-sheet pressed against the lower margin of the printed-section by the lower jaw plate 280 effects the final joinder of the parts of the end-section grasped by said jaw plates 276, 280. Swinging rearward, after the platform *d* has swung downward, the folding-gripper *e'* leads the formed end-section back to the end of the throw of the gripper arms 274. As above explained, the abutment cam 290 engaging the roller 284 causes the jaw-plate 280 to open during the final stage of the rearward swing of the gripper arms 274. During this period the end of the stud $291^a$ on the ejector head 291 is engaged by an adjustable abutment screw 301 threaded in an upright bracket $301^a$. With said stud $291^a$ held against rearward movement, the ejector head 291 and attached fins 294 are likewise held, the result being that the ejector lugs $294^a$ on said fins are caused to push the end-section from the open, yet still receding jaw plates 276, 280 of the folding gripper *e'*.

In the rearward throw of a formed end-section by the folding gripper *e'*, the trailing edge of said end-section settles toward a delivery plate *m* (Figs. 12 and 13) slidable horizontally on a sub-frame 302. This delivery plate *m* includes a hinged section 303 which is thrown into upwardly inclined relation by means of an arm 304 (Figs. 12 and 18) fixed to a rock-shaft 305 journaled in the sub-frame 302. One end of the rock-shaft 305 has an arm 306 (Figs. 10 and 18) depending therefrom, the free end of said arm being connected through a link 307 with an upright lever 308 (Figs. 4, 10 and 13) pivoted at its lower end on the sub-frame 302. This lever 308 carries a flange $308^a$ disposed in the path of one of the brackets 279 on the shaft 278 of the folding-gripper *e'*. The engagement of said bracket 279 with said flange $308^a$ upon the rearward swing of said folding-gripper *e'*, causes the hinged plate section 303 to be swung upward by the arm 304, said plate in its upwardly inclined position presenting a delivery slide for an end-section as it drops from the jaw plates 276, 280 of the folding-gripper *e'*. Sliding down the inclined plate section 303, the advancing edge (previously the trailing edge) of an end-section abuts against an angle-bar guide 309 adjustably fixed on the delivery plate *m*, the now trailing portion of said end-section being later lowered upon the return of said plate section 303 into its horizontal position. At the rear of the delivery plate *m* (Fig. 12), is a sealing conveyor $e^2$ including upper rollers 310 and lower rollers 311 journaled in the sub-frame 302. The forward upper and lower rollers 310, 311 are geared together. So also are the rear upper and lower rollers 310, 311. A gear 312 meshing with both of the lower geared rollers 311, is fixed to a shaft $312^a$ to which a sprocket 313 is also secured. A sprocket chain 314, running over an idler wheel $314^a$ and under an idler wheel $314^b$ (Fig. 5) gears the sprocket 313 with a sprocket 315 (Fig. 13) on the main power shaft 14. The rollers 310, 311 are respectively fitted with apron belts $310^a$, $311^a$, said rollers and belts, co-operating upon movement thereof imparted through the power train just described, provide a delivery conveyor for end-sections placed upon the delivery plate *m*. Said plate *m* is reciprocated, the backward movement thereof from end-sheet receiving position (Fig. 12) being employed to present the rear edge of an end-sheet to the bight of the forward rollers 310, 311. A rock-shaft 316, forming a stop for the arm 304 (Figs. 12 and 18) is journaled at its ends in the sub-frame 302. Said rock-shaft 316 is fitted with a depending arm 317 (Figs. 5 and 18) joined through a link 318 to the lower end of an upright lever 319 pivoted medially and joined at its upper end through a link 320 with the lower end of the lever 29 depending from the rock-shaft 26. Brackets 321 depending from the delivery plate *m* are joined through links 322 with arms 323 depending from the shaft 316. The link 318, slotted at $318^a$, permits of lost motion therein of a pin $319^a$ on the lever 319 so that the rearward thrust of the delivery plate *m* may be effected at the proper interval in the cycle of movement of the machine. An additional arm 324 secured to said shaft 316 carries a weight 325, which causes the shaft 316 to turn in a direction effecting the forward return thrust of the delivery plate *m*. Limiting such rotation of said shaft 316 by said weight 325 is a stop $323^a$ (Fig. 12) secured to the sub-frame 302 and arranged in the path of the arm 323 on said shaft 316. On the rearward delivery thrust of the delivery plate *m*, the advancing edge of an end-section thereon first passes beneath an idler guide-roller 326 journaled in the sub-frame 302 and then passes into the bight of the forward rollers 310, 311 of the conveyor $e^2$. Passing on to the rear rollers 310, 311 and gripped between the apron belts $310^a$, $311^a$, the pasted portions of an end-section are subjected to additional sealing pressure. Paste scrapers 327 (Fig. 12) co-acting with the lower rollers 311 serve to keep said rollers free from paste that may be picked up from the end-sections passing therethrough.

An end-section collecting device $e^3$ disposed at the rear of the conveyor $e^2$ gathers end-sections on edge, paste treated edges lowermost. This collecting device includes a tray plate 328 and sides 328$^a$ rising therefrom, said tray-plate being supported on frame posts 329. A plunger-head 330 slides back and forth on the tray-plate 328, reciprocating movement being imparted thereto through an arm 331 depending from the rock-shaft 316 and a link 332 joining said arm 331 with said plunger-head 330. The arm 331 is supplied with a pin 331$^a$ fitting in a slot 332$^a$ in the forward end of the link 332. A spring 333 stretched between the link 332 and the rock-shaft 316, operates to pull the plunger-head 330 forward to its limit of retraction, while said slot 332$^a$ permits of lost motion between the arm 331 and link 332, whereby actuation of the plunger-head 330 is effected at that interval in the cycle of the machine following the delivery of an end-section from the conveyor $e^2$. Opposing the plunger-head 330 is a rearwardly leaning back-rest 334 for end-sections, the same being slidable upon the tray-plate 328. Rising from the tray-plate 328 are fixed guide-tongues 335 (Figs. 12 and 2), the rearward guiding edges thereof being curved slightly forward. On its rearward throw, the plunger-head 330 is pushed beyond these guide-tongues 335, slots 330$^a$ (Fig. 2) being formed in said plunger head 330 to receive said tongue 335. Rising through openings 336 in the bottom-plate 328 slightly to the rear of the guide-tongues 335 are the tips of pack-holding fingers 337, said fingers being mounted on a finger-bar 338 journaled transversely of the tray-plate 328 and beneath the same. A spring 339 stretched between an anchorage on the underside of the tray-plate 328 and a pin 340 depending from said finger-bar 338, yieldingly holds the tips of the fingers 337 elevated above the upper face of said tray-plate 328. Secured to the lower side of the plunger-head 330 and reciprocable therewith is a depending bracket 341 carrying at the lower end thereof a horizontally balanced pawl 342. The rear tip of this pawl 342 impinges against an arm 343 depending from the finger-bar 338 as the rear face of the plunger-head 330 closely approaches the upturned tips of the fingers 337. Continuing rearwardly with the plunger head 330, the pawl 342 operating through the arm 343 and finger-bar 338 causes the tips of the fingers 337 to be lowered beneath the upper face of the tray-plate 328 before the rear face of the plunger-head 330 reaches the position normally occupied thereby. After said face of said plunger-head 330 has passed said normal position of the tips of said finger 337, the pawl 342 tilts and releases its engagement with said arm 343 with the result that the tips of the fingers 337 are again thrust upward through the openings 336 in the bottom-plate 328. Upright slots 330$^b$ (Figs. 2 and 12) formed in the plunger-head 330 receive the elevated tips of the fingers 337 and provide for clearance between the same and said plunger-head 330 upon the return forward throw of the latter. Depending deflectors 344 (Figs. 4 and 10) are carried on a rock-shaft 345 supported on the sub-frame 302 above and to the rear of the upper rear roller 310 of the conveyor $e^2$. Also depending from this rock-shaft 345 is an arm 346 having a slot 346$^a$ in the lower end thereof. A lever 347, rising from a fulcrum 348 on the tray-plate 328, is supplied with a pin 347$^a$ fitted in said slot 346$^a$. An inverted U-shaped clip 349 secured to the lever 347 near the middle thereof receives a lug 350 on the plunger-head 330, said lever being swung back and forth with said plunger-head 330 through said lug and clip connection. An end-section issuing from the conveyor $e^2$ (Fig. 12) is directed downward, folded edge first, by the deflectors 344, said deflectors, after engaging the advancing edge of the end-section being quickly swung to the rear by means of the lever 347 and arm 346. Turned downward by the deflectors 344 an end-section falls to the tray-plate 328, folded edge first, between the guide-tongue 335 and the tips of the fingers 337. The trailing portion of the end-section, unobstructed from the rear by the deflectors 344, but caught by a fly-rod 351 (Figs. 3 and 12) carried by the lever 347, is thrown rearwardly (dotted lines, Fig. 4) against the rearwardly sloping foremost end-section of a pack supported by said back-rest 334 (Fig. 4). Pushed past the depressed tips of the fingers 337, said end-sheet is backed against the previously deposited end-section, the back-rest 334 giving way under the pressure of the plunger-head 330 for the newly deposited end-section and the tips of the fingers 337 rising again to catch and hold the lower edge of said end-section.

Beneath the tray-plate 328 is an electric heater element 352 (dotted lines, Fig. 12), the same serving to heat the tray-plate 328 and dry the paste treated portions of the delivered end-sections as they are pushed along said plate 328.

Under ordinary operating conditions, end-sheets, hinge-strips therefor, smudge-sheets and printed-sections are fed into the machine by their respective mechanisms A, C, B and D. The diagrammatical views embraced in Fig. 26, illustrate the simultaneous action of the mechanisms A, B and D in feeding an end-sheet $n$, a smudge-sheet $s$ and a printed-section $p$. The diagrammatical views embraced in Fig. 27 show an end-sheet n deposited upon the bed-plates 57, 57$^a$, a smudge-sheet s deposited upon the carrier rack c and a printed-section p deposited upon the registering platform d. An end-sheet n is pushed toward the foot of the machine into position (Fig. 28) where it is supplied with a hinge-strip n' and folded transversely, and from which position the hinge bound end-sheet is carried to the tines 167 of the transfer rack f (Fig. 29), the hinge-strip n' during the travel of said end-sheet n, to said transfer rack being sealed at its pasted margins to the extremities of the end-sheet n opposite the fold therein. A smudge-sheet s is carried by the fingers 180 of the upper rack c to position above the tines 167 of the transfer rack f, the lower rear margin of said smudge-sheet being pasted by the paste-wheel 206 during such travel. The particular smudge-sheet brought by the rack c over a given hinge-bound end-sheet on the transfer rack f is not the one fed at the time of the introduction of said given end-sheet, but the next one fed thereafter. Gathered together in dropping from the upper rack c and from the transfer rack f, a smudge-sheet s and hinge bound end-sheet n fall to the slats 181 of the lower rack g then positioned to receive them (Fig. 30). Moved toward the foot of the machine on said lower rack g, the marginally pasted smudge-sheet s is sealed by the roller 208 to the hinge-strip n' of the end-sheet assembly (Fig. 30) and the end-sheet n is marginally pasted by the paste-wheel 207. Carried on by the rack g to the foot of the machine and into position over the registering platform d (Fig. 31), the now united smudge-sheet s and hinge bound end-sheet n superimpose a printed-section p supported by said platform. In this connection, it will be understood that the particular printed-section superimposed by a given end-sheet is not the one fed at the time of the introduction of said given end-sheet, but the second one fed thereafter. A united smudge-sheet s and hinge bound end-sheet n, are gathered with a printed-section p (Fig. 31), all being registered in the gathering process and gripped together (Fig. 22). The marginal portion of the united smudge-sheet and bound end-sheet are thereafter turned down over the edge of the printed-section p (Fig. 23) and thence clamped against the underside thereof (Fig. 24). The end-sheet n having been pasted for attachment to the printed-section p, the clamping action, effected by the folding gripper e', results in the final joinder of parts in the now completely assembled end-section. Carried rearwardly by said folding gripper e', an end-section is deposited on the delivery plate m (Fig. 12) and thence fed thereby to the sealing conveyor e$^2$. Issuing from this conveyor, an end-sheet is deposited in a tray 328, folded edge foremost. Accumulating in this tray and sliding on their paste treated edges along the heated tray-plate 328, the end-sections are dried sufficiently to securely hold together the united elements thereof.

Bound with intermediate book-sections, the "first" and "last" end-sections are trimmed in the shearing operation, the marginal part of each end-sheet containing the fold therein being cut away, the inside leaf portion of each end-sheet supplying a fly-leaf. Before an assembly of bound book-sections, "first" and "last" end-sections included, is applied to a book cover, the smudge sheets of the end-sections are torn away, the outside end-sheet portions of said "first" and "last" sections being thereafter respectively pasted to the inner faces of the front and back book covers.

The binding of end-sheets with fabric hinge-strips may be dispensed with by discontinuing the supply of fabric to the fabric feeding jaws 66$^a$, 66$^b$. In this event, longer end-sheets are used to make up for the omission of hinge-strips, said longer sheets being folded medially by the folder-blade 149. Of course, the use of unbound end-sheets results in an inferior book structure, but some classes of work require the less expensive binding.

In the binding of books by the "cased in" method, the use of smudge-sheets may be dispensed with. And this is accomplished merely by omitting to supply smudge-sheets to the table 58.

Changes in the specific form of my invention, as herein disclosed, may be made within the scope of what is claimed without departing from the spirit of my invention.

Having described my invention, what I claim as new and desire to protect by Letters Patent is:

1. In a machine for forming book end-sections, a frame work, a table at one side thereof for stacked end-sheets, means for severally feeding said end-sheets endwise into the machine, a reel for a roll of fabric, means for paying out the fabric, step by step, shearing mechanism to sever hinge forming strips from the fabric, means for advancing a fed end-sheet to position for joinder of an end thereof with a formed hinge-strip, pasting means serving during the advancement of said end-sheet to marginally paste the ends thereof, sealing means to unite one pasted end of the end-sheet with the hinge-strip, folding mechanism for doubling the hinge bound end-sheet, end to end, and sealing together the ends of the bound sheet structure, a transfer rack to receive the doubled sheet structure from said folding mechanism, a second table on the frame for stacked smudge-sheets, means for severally feeding said smudge-sheets into the machine, a carrier rack adapted to receive a fed smudge-sheet and advance the same along the machine, means serving during the advancement of the smudge-sheet to paste a margin thereof, said carrier rack being adapted to deposit the smudge-sheet on a doubled sheet structure on said transfer rack with the pasted margin of the former against the hinge strip on the latter, a second carrier rack, said transfer rack being adapted to deposit its load on said second carrier rack, a table on the frame for stacked book-sections, means for severally feeding said book-sections into the machine, said second carrier rack being adapted to gather a doubled sheet structure and a companion smudge-sheet thereon with a fed book-section, a sealing element for uniting the pasted smudge sheet with the doubled sheet structure, an element for pasting the hinge equipped portion of the doubled sheet structure at the margin thereof opposite the smudge sheet, both of said elements operating during the advancement of said sheet assembly by said second carrier rack, and a folding-gripper serving to turn said last pasted margin of said sheet structure around an edge of and against the book-section and also serving to deliver united end-section members from position of final joinder thereof.

2. In a machine for forming book end-sections, a transfer-rack, a smudge-sheet rack movable to and from position closely superimposing said transfer-rack, a book-section platform, a carrier-rack movable from position beneath said transfer-rack to position superimposing said book-section platform, means for severally feeding end-sheets to said transfer-rack, means for severally feeding smudge-sheets to said smudge-sheet rack, said latter rack being adapted to discharge a smudge-sheet upon an end-sheet carried by said transfer-rack, said transfer-rack being adapted to discharge a smudge-sheet and end-sheet assembly therefrom to said carrier-rack, means for severally feeding book-sections to said platform, said carrier-rack being adapted to gather a smudge-sheet and end-sheet assembly with a book-section on said platform with a marginal portion of said smudge-sheet and end-sheet assembly overreaching an edge of said book section, a gripper for turning said overreaching portion of said sheet assembly over the adjacent edge of said book-section, means for marginally pasting one of the members of said sheet assembly prior to the folding operation, means for marginally pasting one of the end-section members whereby said gripper will seal the end-sheet and book-section together during the folding operation, said gripper being adapted to deliver the formed end-sheet.

3. In a machine for forming book end-sections, a transfer-rack, an upper rack movable into position superimposing said transfer-rack, a registering platform, means for severally supplying book-sections thereto, a lower rack movable from position beneath the transfer-rack into position superimposing said registering platform and back again, means for severally supplying end-sheets to the transfer-rack, means for severally supplying smudge sheets to said upper rack, said upper rack being adapted to discharge a smudge-sheet onto an end-sheet supported by said transfer-rack, said transfer-rack being adapted to discharge a gathered end-sheet and smudge-sheet onto the lower rack, said registering-platform being hinged, said second carrier rack being also hinged and adapted to be swung upward by said registering platform, mechanism associated with said platform for arranging a gathered smudge-sheet and end-sheet in position with the marginal portion of said latter sheet assembly overreaching an edge of a book-section on said platform, a clutch member co-operating with said platform to grip together such related sheet assembly and a book-section, means for turning said overreaching portion of said sheet assembly over an edge of a companion book-section, a gripper for clamping said turned portion of said sheet assembly against the back of said book-section, said gripper being adapted to take said assembled end-section elements from the registering platform.

4. In a machine for forming book end-sections, a frame work, a table at one side thereof for stacked end-sheets, means for feeding said end-sheets endwise into the machine, one at a time, a reel for a roll of fabric, means for feeding the fabric, step by step, into the machine, shearing mechanism for severing hinge forming strips therefrom, means for advancing a fed end-sheet to position for joinder of an end thereof with a formed hinge-strip, pasting means serving during the advancement of said end-sheet to marginally paste the ends thereof, sealing means for uniting one pasted portion of the end-sheet with a hinge-strip, folding mechanism for doubling the hinge bound sheet, also for sealing together the ends of the bound sheet structure and, further, for passing said sheet structure onward in the machine, a carrier to receive the doubled sheet structure, a table on the frame for stacked book-sections, means for feeding said sections one at a time into the machine, said carrier being adapted to gather a doubled sheet structure with a fed book-section, means serving to paste the hinge equipped portion of the doubled sheet structure marginally thereof during its advancement by said carrier, means for turning the pasted margin of said structure around the back edge of and against the book-section and for delivering the assembled end-section.

5. In a machine for forming book end-sections, mechanism for gathering an end-sheet and a book-section from sources of supply thereof, means adapted to fold a portion of the end-sheet about the back edge of the book-section, means for applying paste to one of the gathered members prior to the folding of the end-sheet on the book-section to provide for securing the turned portion of the former to the latter, and conveyor mechanism for formed end-sections, said folding means being adapted to deliver the assembled end-section to said conveyor mechanism after uniting the members of said end-section.

6. In a machine for forming book end-sections, mechanism for gathering an end-sheet and a book section from sources of supply thereof, means adapted to fold a portion of the end-sheet about the back edge of the book section, means for applying paste to one of the gathered members prior to the folding of the end-sheet on the book-section to provide for securing the turned portions of the former to the latter, a receiver including a hot-plate for drying the paste treated portions of end-sections delivered thereto, and a conveyor mechanism for delivering assembled end-sections into said receiver, said folding means serving to deliver end-sections, united thereby, to said conveyor mechanism.

7. In a machine for forming book end-sections, mechanism for gathering an end-sheet and a book section from sources of supply thereof, folding-delivery means adapted to fold a portion of the end-sheet about the back edge of the book-section, means for applying paste to one of the gathered members prior to the folding of the end-sheet on the book section to provide for securing the turned portions of the former to the latter, and a heated receiver arranged to receive assembled end-sections from said folding-delivery means.

8. In a machine for forming book end-sections, mechanism for gathering end sheets and book-sections from sources of supply thereof, means adapted to fold a portion of an end-sheet about the back edge of a book-section, a pasting device for applying an adhesive to one member of gathered end-section members prior to the folding of the end-sheet on the book-section to provide for securing the turned portion of the former to the latter, a sealing-delivery conveyor mechanism, said folding means serving to feed an end-section, united thereby, to said conveyor mechanism, a receiving tray beneath said conveyor mechanism, deflectors at the delivery end of said mechanism for turning a discharged end-sheet downward upon the bottom of the tray, paste treated edge foremost, a movable back rest for a pack of end-sheets in said tray and a reciprocating pusher arranged to press against the last delivered end-sheet with greatest pressure at the lower treated margin thereof and to slide the pack along said tray.

9. In a machine for forming book end-sections, mechanism for gathering end-sheets and book sections from sources of supply thereof, means adapted to fold a portion of an end-sheet about the back edge of a book section, a pasting device for applying an adhesive to one member of gathered end-section members prior to the folding of the end-sheet on the book section to provide for securing the turned portion of the former to the latter, a sealing-delivery conveyor mechanism, said folding means serving to feed an end-section, united thereby to said conveyor mechanism, a receiving tray beneath said conveyor mechanism, deflectors at the delivery end of said mechanism for turning a discharged end-sheet downward upon the bottom of the tray, paste treated edge foremost, a movable back rest for a pack of end-sheets in said tray and a reciprocating pusher arranged to press against the last delivered end-sheet with greatest pressure at the lower treated margin thereof and to slide the pack along said tray, and means for heating the bottom of the tray.

10. In a machine for forming book end-sections, means for gathering an end-sheet and a book-section with a marginal portion of the former overreaching the back edge of the latter, clamping mechanism for temporarily holding said end-sheet and book-section in gathered relation, a gripper for turning said overreaching portion of the end-sheet around the back edge of the book-section and for clamping said portion against the back of said section, means for pasting one of said end-section members prior to the folding of said end-sheet by said gripper to secure a bond between said turned portion of the end-sheet and said book-section, said gripper being adapted to take the formed end-section from said clamping mechanism, a receiving tray, a sealing conveyor interposed between said tray and gripper, and means for receiving a formed end-section from said gripper and delivering the same to the sealing conveyor, said conveyor being adapted to discharge said end-section into said tray.

11. In a machine for forming book end-sections, means for gathering an end-sheet and a book-section with a marginal portion of the former overreaching the back edge of the latter, clamping mechanism for temporarily holding said end-sheet and book-section in gathered relation, a gripper for turning said overreaching portion of the end-sheet around the back edge of the book-section and for clamping said portion against the back of said section, means for pasting one of said end-section members prior to the folding of said end-sheet by said gripper to secure a bond between said turned portion of the end-sheet and said book-section, said gripper being adapted to take the formed end-section from said clamping mechanism, a receiving tray and means interposed between said gripper and tray for receiving a formed end-section from said gripper and delivering the same, paste treated edge first, to the bottom of said tray.

12. In a machine for forming book end-sections, means for gathering an end-sheet and a book-section with a marginal portion of the former overreaching the back edge of the latter, clamping mechanism for temporarily holding said end-sheet and book-section in gathered relation, a gripper for turning said overreaching portion of the end-sheet around the back edge of the book-section and for clamping said portion against the back of said section, means for pasting one of said end-section members prior to the folding of said end-sheet by said gripper to secure a bond between said turned portion of the end-sheet and said book-section, said gripper being adapted to take the formed end-section from said clamping mechanism, a receiving tray and means interposed between said gripper and tray for receiving a formed end-section from said gripper and delivering the same, paste treated edge first, to the bottom of said tray, and means for heating the bottom of said tray.

13. In a machine for forming book end-sections, means for gathering an end-sheet and a book-section with a marginal portion of the former overreaching the back edge of the latter, clamping mechanism for temporarily holding said end-sheet and book-section in gathered relation, a gripper for turning said overreaching portion of the end-sheet around the back edge of the book-section and for clamping said portion against the back of said section, means for pasting one of said end-section members prior to the folding of said end-sheet by said gripper to secure a bond between said turned portion of the end-sheet and said book-section, said gripper being adapted to take the formed end-section from said clamping mechanism.

14. In a machine for forming book end-sections, means for gathering an end-sheet and a book-section with a marginal portion of the former overreaching an edge of the latter, clamping mechanism for holding said end-sheet and book-section in such gathered relation, means for turning said overreaching portion of the end-sheet over the adjacent edge of the book-section, and means for clamping said portion of said end-sheet against the back of said book-section.

15. In a machine for forming book end-sections, a registering device, means for delivering a book-section and an end-sheet thereto, said device being adapted to arrange the end-sheet with a marginal portion thereof overreaching an edge of the book-section, a clutch bar co-operating with said registering device to clamp an end-sheet and book-section together, a gripper for turning said overreaching portion of the clamped end-sheet around the adjacent edge of the clamped book-section and for pressing said portion against the back of said section, means for pasting one of said end-section members prior to the folding of the end-sheet by said gripper to secure a bond between said turned portion of the end-sheet and said book-section, said gripper being adapted to deliver the formed end-section.

16. In a machine of the class described, means for severally taking end-sheets from a source of supply, means for severally taking book-sections from a source of supply, gathering means for bringing a fed book-section and a fed end-sheet together, a gripper for folding a portion of the end-sheet around the back edge of the book-section and clamping said portion against said section, means for pasting one of the gathered members prior to said folding of the end-sheet to provide for securing said folded portion of said end-sheet to said book-section, said gripper also serving to deliver the assembled end-sheet.

17. In a machine of the class described, end-sheet feeding means, book-section feeding means and carrier mechanism adapted to bring an end-sheet and a book-section together with a portion of the former overreaching the back edge of the latter, gripper mechanism movable forth and back and including jaw members, means for opening and closing said jaw members, said mechanism being adapted, prior to the closing of the jaw members, to approach and turn said overreaching portion of the end-sheet about the back edge of the book-section, then clamp said turned portion against said section upon the closing of the jaw members and finally carry along and drop the assembled end-sheet.

18. In a machine for forming book end-sections, a hinged platform, means for feeding a book-section thereto, a carrier movable into position closely superimposing said platform and adapted to carry an end-sheet over a fed book-section with a marginal portion thereof overreaching an edge of said book-section, said carrier being hinged and swung by said platform, a clutch member, said platform co-operating with said clutch member temporarily to clamp a book-section against an end-sheet gathered therewith, a gripper for turning said overreaching portion of the end-sheet around the adjacent edge of the book-section and for clamping said portion against the back of said section, means for marginally pasting one of said end-section members prior to the folding of said end-sheet by said grippers to secure a bond between said turned portion of the end-sheet and said book-section, said gripper being adapted to deliver the formed end-sheet.

19. In a machine for forming book end-sections, means for gathering an end-sheet and a book-section, adjustable means for registering said gathered elements endwise and sidewise, the latter registration providing for an arrangement of the end-sheet with respect to the book-section, wherein a marginal portion of the former overreaches an edge of the latter, means for clamping together an end-sheet and book-section thus related, a gripper for turning said overreaching portion of the end-sheet around the adjacent edge of the book-section and for clamping said portion against the back of said section, said gripper being adapted to deliver the end-sheet formed in said gathering and folding operations.

20. In a machine for forming book end-sections, means for feeding sheets into the machine, one at a time, means for feeding fabric from a roll into the machine, a shearing device to sever hinge forming strips from the fabric, sheet advancing mechanism for gathering a fed sheet with a formed hinge-strip, means for pasting one of said gathered members, sealing means to secure said members together, means for marginally pasting the end of the sheet opposite said hinge-strip, means for doubling the hinge bound strip medially of its ends and sealing the pasted margin of the sheet with the margin of the strip faced thereagainst in the doubling of said sheet, feeding mechanism for introducing book-sections into the machine, a carrier for gathering the doubled hinge bound sheet with a fed book-section, means for marginally pasting one of said last gathered members and a folding-delivery gripper adapted to turn a part of the bound portion of the doubled sheet over the back edge of the book-section and thereby seal the doubled sheet and book-section together, said gripper serving also to deliver the assembled end-section.

21. In a machine for forming book end-sections, sheet feeding means, hinge-strip feeding means, book-section feeding means, means for binding a fed sheet with a fed hinge-strip, means for gathering a bound sheet with a fed book-section and means for folding the sheet binding hinge-strip over the back edge of said book-section and delivering the assembled end-section.

In testimony whereof, I have signed my name to this specification.

SWAN SMITH.